US012444360B2

(12) United States Patent
Lee et al.

(10) Patent No.: US 12,444,360 B2
(45) Date of Patent: Oct. 14, 2025

(54) DISPLAY APPARATUS

(71) Applicant: Samsung Display Co., Ltd., Yongin-si (KR)

(72) Inventors: Jaewoo Lee, Yongin-si (KR); Taeho Kim, Yongin-si (KR); Seungjun Lee, Yongin-si (KR); Yongsu Lee, Yongin-si (KR); Seunghwan Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/435,922

(22) Filed: Feb. 7, 2024

(65) Prior Publication Data

US 2024/0321200 A1 Sep. 26, 2024

(30) Foreign Application Priority Data

Mar. 24, 2023 (KR) ........................ 10-2023-0039115
Jun. 19, 2023 (KR) ........................ 10-2023-0078352

(51) Int. Cl.
*G09G 3/3233* (2016.01)

(52) U.S. Cl.
CPC ... *G09G 3/3233* (2013.01); *G09G 2300/0452* (2013.01); *G09G 2300/0842* (2013.01); *G09G 2320/0233* (2013.01)

(58) Field of Classification Search
CPC .................................................... G09G 3/3233
USPC .......................................................... 345/690
See application file for complete search history.

(56) References Cited

U.S. PATENT DOCUMENTS 8,115,788 B2 * 2/2012 Kimura ................ H10D 86/423 345/694
11,501,706 B2 11/2022 Keum et al.
2014/0111557 A1 * 4/2014 Omata ................ G09G 3/3233 345/76
2014/0152712 A1 * 6/2014 Shishido ............. G09G 3/2003 345/83
2015/0379924 A1 * 12/2015 Matsueda ........... G09G 3/3208 345/77
2022/0336565 A1 10/2022 Cho et al.
2023/0022927 A1 1/2023 Park
(Continued)

FOREIGN PATENT DOCUMENTS

CN 115274813 A 11/2022
KR 10-2021-0105478 A 8/2021
(Continued)

*Primary Examiner* — Kwin Xie
(74) *Attorney, Agent, or Firm* — Womble Bond Dickinson (US) LLP

(57) ABSTRACT

A display apparatus for reducing a reduction in image quality due to signal interference between adjacent lines comprises a substrate, pixels comprising at least a first pixel group to a third pixel group, data lines comprising at least a first data line to a third data line, and a data distributor for alternately transferring data signals to at least one pair of data lines among the data lines, wherein one end of a first horizontal line of the first data line is arranged adjacent to blue-based pixels of the first pixel group, one end of a second horizontal line of the second data line is arranged adjacent to green-based pixels of the second pixel group, and one end of a third horizontal line of the third data line is arranged adjacent to blue-based pixels of the third pixel group.

20 Claims, 15 Drawing Sheets

(56) References Cited

U.S. PATENT DOCUMENTS

| | | | | |
|---|---|---|---|---|
| 2023/0137112 A1* | 5/2023 | Omata | G09G 3/32 345/690 |
| 2023/0142218 A1* | 5/2023 | Peng | G09G 3/2003 345/690 |
| 2023/0178013 A1* | 6/2023 | Oh | G09G 3/3233 345/690 |

FOREIGN PATENT DOCUMENTS

| | | | |
|---|---|---|---|
| KR | 10-2022-0094300 | A | 7/2022 |
| KR | 10-2022-0145937 | A | 10/2022 |
| KR | 10-2023-0016764 | A | 2/2023 |

* cited by examiner

DISPLAY APPARATUS

CROSS-REFERENCE TO RELATED APPLICATION

The present application claims priority to, and the benefit of, Korean Patent Application Nos. 10-2023-0039115, filed on Mar. 24, 2023, and 10-2023-0078352, filed on Jun. 19, 2023, in the Korean Intellectual Property Office, the entire disclosure of which is incorporated herein by reference.

BACKGROUND

1. Field

One or more embodiments relate to a display apparatus for reducing or preventing a reduction in image quality due to signal interference between adjacent lines.

2. Description of the Related Art

A display apparatus is an apparatus that receives information about an image, and that displays the image. A display apparatus may be used as a display unit of a small-sized product, such as a mobile phone, or may be used as a display unit of a large-sized product, such as a television.

A display apparatus includes a plurality of pixels for receiving electrical signals to emit light to display an image to the outside. Each pixel includes a light-emitting element, for example, an organic light-emitting display apparatus includes an organic light-emitting diode (OLED) as the light-emitting element. Generally, an organic light-emitting display apparatus includes a thin-film transistor and an OLED on a substrate, and the OLED operates by emitting light by itself.

When driving such a display apparatus, it is suitable to reduce or minimize the effect caused by signal interference between adjacent wires.

SUMMARY

One or more embodiments include a display apparatus for reducing a reduction in image quality due to signal interference between adjacent lines. However, these aspects are only examples, and the scope of the disclosure is not limited thereto.

Additional aspects will be set forth in part in the description which follows and, in part, will be apparent from the description, or may be learned by practice of the presented embodiments of the disclosure.

According to one or more embodiments, a display apparatus includes a substrate, pixels above the substrate, and including a first pixel group including red-based pixels and blue-based pixels arranged in a first direction, a second pixel group including green-based pixels arranged in the first direction, and a third pixel group including other red-based pixels and other blue-based pixels arranged in the first direction, data lines for transferring data signals to the pixels, and a data distributor for alternately transferring the data signals to a pair of the data lines, wherein the data lines include a first data line including a first horizontal line extending in a second direction crossing the first direction for transferring a data signal to the first pixel group, one end of the first horizontal line being adjacent to one of the blue-based pixels of the first pixel group, a second data line including a second horizontal line extending in the second direction for transferring the data signal to the second pixel group, one end of the second horizontal line being adjacent to one of the green-based pixels of the second pixel group, and a third data line including a third horizontal line extending in the second direction for transferring the data signal to the third pixel group, one end of the third horizontal line being adjacent to another of the blue-based pixels of the third pixel group.

In plan view, the second pixel group may be between the first pixel group and the third pixel group.

In plan view, the first horizontal line may be between the second horizontal line and the third horizontal line.

In plan view, one of the red-based pixels of the first pixel group and one of the blue-based pixels of the third pixel group may be alternately arranged in the second direction.

The display apparatus may further include a group of connection nodes electrically connecting the data lines and the data distributor.

The substrate may include, in plan view, a first area at one side of a first virtual line extending in the first direction, and a second area at another side of the first virtual line.

The group of the connection nodes may be between the pixels and the data distributor in the first area.

In plan view, a length of the first horizontal line may be longer than a length of the second horizontal line and a length of the third horizontal line.

The display apparatus may further include gate lines for transferring scan signals to the pixels and extending in the second direction.

The gate lines may include a first gate line adjacent to the second horizontal line, a second gate line adjacent to the first horizontal line, and a third gate line adjacent to the third horizontal line.

A brightness of the one of the blue-based pixels of the first pixel group may be configured to be changed by one of the scan signals of the second gate line.

The second gate line may be arranged in a 4n−1-th order among the gate lines.

The first gate line may be arranged in a 4n-th order among the gate lines.

The second gate line may be arranged in an 8n−5-th order among the gate lines.

The first gate line may be arranged in an 8n−4-th order among the gate lines.

The first data line may further include a first vertical line extending in the first direction, adjacent to the first pixel group, and electrically connected to one end of the first horizontal line through a first contact that is adjacent to the one of the blue-based pixels of the first pixel group.

The first data line may further include a first sub line extending in the first direction in the second area of the substrate for connecting another end of the first horizontal line and the group of the connection nodes.

One end of the first horizontal line may be in the first area of the substrate, wherein another end of the first horizontal line is in the second area of the substrate, and wherein the first data line further includes a first vertical line extending in the first direction in the first area of the substrate.

The second gate line may be arranged in a 4n−3-th order among the gate lines.

The second data line may further include a second sub line extending in the first direction in the second area of the substrate for connecting another end of the second horizontal line and the group of the connection nodes, and having a length that is longer than a length of the first sub line.

According to one or more embodiments, a display apparatus includes a substrate including a first area, and a second area at one side of the first area, pixels in the second area, and including RB-pixel groups including red-based pixels and blue-based pixels arranged in a first direction, and G-pixel groups including green-based pixels arranged in the first direction, data lines for transferring data signals to the pixels, and a data distributor for alternately transferring the data signals to at least one pair of the data lines, wherein the data lines include RB-data lines extending in a second direction crossing the first direction, for transferring some of the data signals to the RB-pixel groups, and including a first horizontal line portion extending from the first area of the substrate to the second area of the substrate, and G-data lines extending in the second direction for transferring others of the data signals to the G-pixel groups, and including a second horizontal line portion extending from the first area of the substrate to the second area of the substrate, wherein one end of the first horizontal line portion is adjacent to one of the blue-based pixels of the RB-pixel groups in the second area of the substrate, and wherein one end of the second horizontal line portion is adjacent to one of the green-based pixels of the G-pixel groups in the second area of the substrate.

The first horizontal line portion may include at least a first-1 horizontal line and a first-2 horizontal line, which extend in the second direction, wherein the second horizontal line portion includes at least a second-1 horizontal line and a second-2 horizontal line, which extend in the second direction.

In plan view, the first-1 horizontal line and the first-2 horizontal line may be adjacent to each other in the first direction, wherein, in plan view, the second-1 horizontal line and the second-2 horizontal line are adjacent to each other in the first direction.

In plan view, the first-1 horizontal line and the first-2 horizontal line may be adjacent to each other in the first direction, wherein the second-1 horizontal line and the second-2 horizontal line are adjacent to each other in the first direction.

BRIEF DESCRIPTION OF THE DRAWINGS

The above and other aspects of embodiments of the disclosure will be more apparent from the following description taken in conjunction with the accompanying drawings, in which.

DETAILED DESCRIPTION

Figure 1:
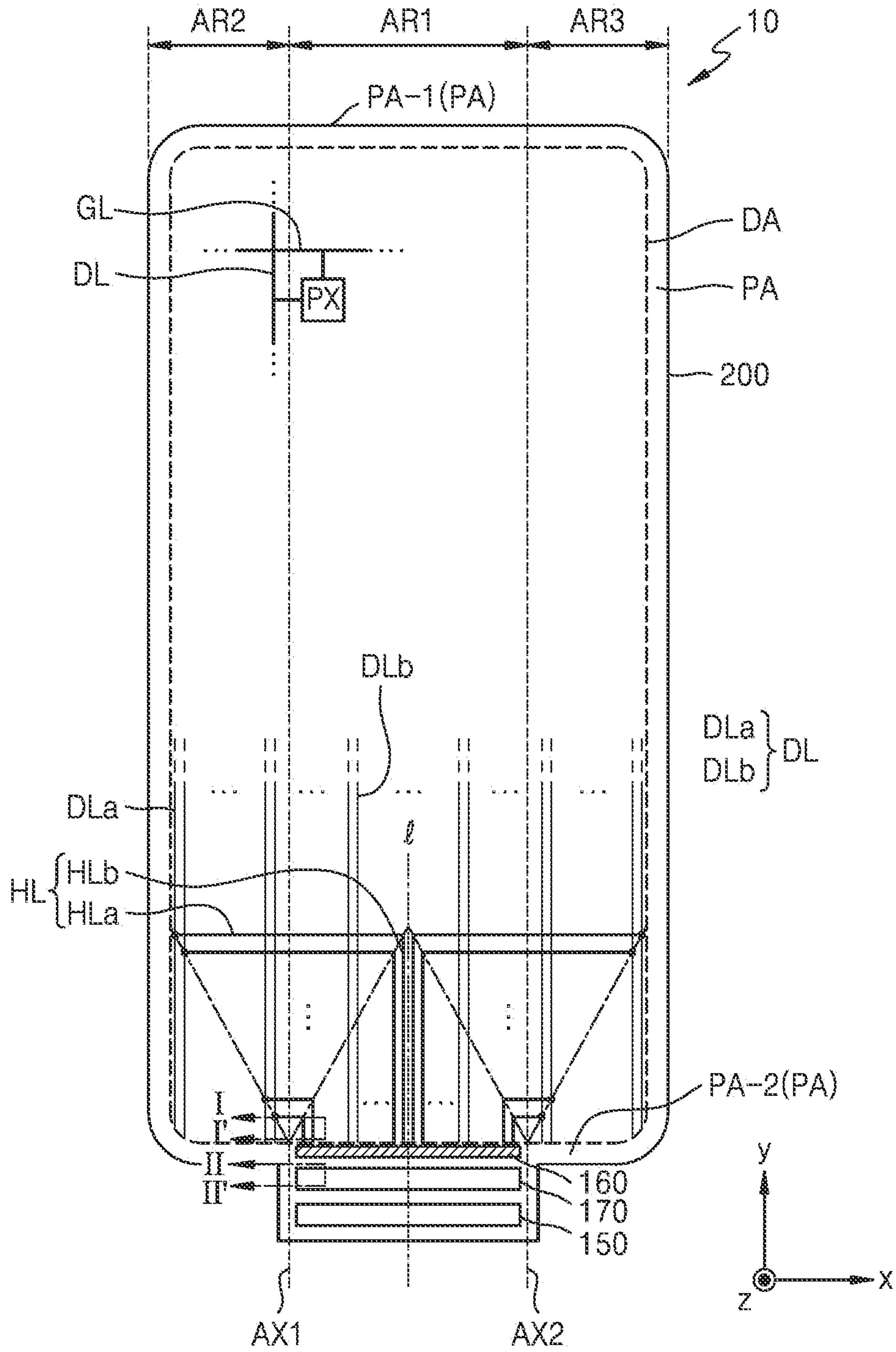
FIG. 1 is plan view schematically illustrating a display apparatus according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms “a” and “an” are intended to include the plural forms as well, while the plural forms are also intended to include the singular forms, unless the context clearly indicates otherwise. It will be further understood that the terms “comprises,” “comprising,” “have,” “having,” “includes,” and “including,” when used in this specification, specify the presence of the stated features, integers, steps, operations, elements, and/or components, but do not preclude the presence or addition of one or more other features, integers, steps, operations, elements, components, and/or groups thereof.

As used herein, the term “substantially,” “about,” “approximately,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a display apparatus according to one or more embodiments is described in detail.

FIG. 1 is plan view schematically illustrating a display apparatus according to one or more embodiments.

As shown in FIG. 1, a display apparatus 10 may include a display area DA, and a peripheral area PA positioned outside the display area DA. The display apparatus 10 may provide an image to the outside by using light emitted from the display area DA. Because the display apparatus 10 includes a substrate 200, the substrate 200 may also be seen to have the display area DA and the peripheral area PA.

The substrate 200 may include various materials, such as glass, metal, plastic, or the like. According to one or more embodiments, the substrate 200 may include a flexible material. Herein, the flexible material refers to a substrate which may be crooked, bent, folded, or rolled. The substrate 200 of the flexible material may include ultra-thin glass, metal, or plastic. The substrate 200 is described in detail below.

Pixels PX including various display elements, such as an organic light-emitting diode (OLED), may be arranged in the display area DA of the substrate 200. The pixels PX may be arranged in various forms, such as a stripe arrangement, a PENTILE™ arrangement (e.g., a RGBG matrix structure, a PENTILET matrix structure, a PENTILE™ structure, or an RGBG structure, PENTILE™ being a registered trademark of Samsung Display Co., Ltd., Republic of Korea), a mosaic arrangement, or the like, to implement an image.

The display area DA may have a rounded rectangular planar shape, as shown in FIG. 1. In one or more other embodiments, the planar shape of the display area DA may have a polygonal shape, such as a triangular shape, a pentagonal shape, a hexagonal shape, or the like, or a circular shape, an elliptical shape, an atypical shape, or the like.

The peripheral area PA may surround the display area DA. The peripheral area PA is an area in which the pixels PX are not arranged, and various lines configured to transfer electrical signals to the display area DA, as well as a pad area including pads to which a printed circuit board or a driver integrated circuit (IC) chip is attached, may be positioned in the peripheral area PA. The pads may be electrically connected to a data driver.

The peripheral area PA may include a first peripheral area PA-1 arranged on one side of the display area DA, and a second peripheral area PA-2 arranged on another side of the display area DA. For example, the display area DA may be between the first peripheral area PA-1 and the second peripheral area PA-2. For example, a data driver 150 and a data distributor (e.g., a data distribution unit) 170, which will be described below, may be arranged in the second peripheral area PA-2. For example, the first peripheral area PA-1 may be spaced apart from the data driver 150 and the data distributor 170, which will be described below, by at least the display area DA.

In one or more embodiments, a data driver for providing a data signal may be located on a film electrically connected to pads arranged in the second peripheral area PA-2 in a chip-on-film (COF) method. According to one or more other embodiments, the data driver may be directly located on the substrate 200 in a chip-on-glass (COG) or chip-on-plastic (COP) method. At this time, the data driver may be the data driver 150 to be described below.

Signal lines capable of applying electrical signals to the pixels PX may be positioned in the display area DA.

As will be described below, each of the pixels PX may include a display element and a pixel circuit for driving the display element. For example, the display element may be an organic light-emitting diode, and the pixel circuit may include transistors, a storage capacitor, or the like. The pixels PX may include first pixels for emitting light of a first color, second pixels for emitting light of a second color, and third pixels for emitting light of a third color. For example, the first color may be red, the second color may be blue, and the third color may be green.

Signal lines capable of applying electrical signals to the pixels PX may include gate lines GL, data lines DL, or the like. Each of the data lines DL may extend in a column direction (e.g., ±y direction), and each of the gate lines GL may extend in a row direction (e.g., ±x direction).

The gate lines GL, for example, may be arranged in a plurality of rows, and may be configured to respectively transfer scan signals to the pixels PX. The data lines, for example, may be arranged in a plurality of columns, and may be configured to respectively transfer data signals to the pixels PX. Each of the pixels PX may be connected to at least one corresponding gate line GL among the gate lines GL, and to a corresponding data line DL among the data lines DL.

In one or more embodiments, the display apparatus 10 may include a first area AR1, a second area AR2, and a third area AR3. The second area AR2 and the third area AR3 may be spaced apart from each other with the first area AR1 therebetween. Because the display apparatus 10 includes the substrate 200, the substrate 200 may also be seen to have the first area AR1, the second area AR2, and the third area AR3.

Each of the first area AR1, the second area AR2, and the third area AR3 may overlap at least a portion of the display area DA. Each of the first area AR1, the second area AR2, and the third area AR3 may overlap at least a portion of the peripheral area PA.

In one or more embodiments, the display apparatus 10 may include the first area AR1 arranged on one side based on a first reference line AX1, and the second area AR2 arranged on another side based on the first reference line AX1. The first reference line AX1 may be a virtual line extending in a first direction, or in a y-axis direction, in plan view.

The display apparatus 10 may include the second area AR2 arranged on one side based on a second reference line AX2, and the third area AR3 arranged on another side based on the second reference line AX2. In plan view, the second reference line AX2 may be a virtual line parallel to the first reference line AX1, and spaced apart from the first reference line AX1 in an x-axis direction.

The second area AR2 and a portion of the first area AR1, which are positioned on the left side of a virtual line € crossing an approximate center of the display apparatus 10 in a row direction (e.g., ±x direction), and another portion of the first area AR1 and the third area AR3, which are positioned on the right side of the virtual line €, may be approximately horizontally symmetrical with respect to the virtual line €.

The first area AR1 may partially overlap the second peripheral area PA-2. A connection node unit (e.g., a group of connection nodes) to be described below may be arranged in the first area AR1. For example, the first area AR1 may be defined as an area in which the group of connection nodes is arranged from among the first area AR1 to the third area AR3. Alternatively, for example, the first area AR1 is an area arranged in the middle from among the first area AR1 to the third area AR3, and may be defined as an area in which the group of connection nodes to be described below is arranged.

Hereinafter, descriptions are made with reference to the second area AR2 and a portion of the first area AR1, which are positioned on the left side of the virtual line €, and the descriptions may also be applied to another portion of the first area AR1 and the third area AR3, which are positioned on the right side of the virtual line € in the same manner.

As shown in FIG. 1, the data lines DL may include first vertical line portions DLa extending in the second area AR2 in a column direction (e.g., ±y direction), and second vertical line portions DLb extending in the first area AR1 in the column direction (e.g., ±y direction). At this time, the first vertical line portions DLa may refer to vertical lines to be described below, or may be replaced with the term vertical lines.

The first vertical line portions DLa may be respectively connected to connection lines HL. The connection lines HL may respectively transfer electrical signals supplied from the data driver 150 to be described below to the first vertical line portions DLa. For example, data signals may be respectively applied to the first vertical line portions DLa through the connection lines HL. In this case, fan-out lines respectively connected to the first vertical line portions DLa may be omitted. Accordingly, a portion of the peripheral area PA in which the fan-out lines are arranged may be removed. Because an area of the peripheral area PA may be reduced by an area in which the fan-out lines are arranged, a dead area of the display apparatus 10 may be reduced. At this time, the connection lines HL may be used as a term including horizontal lines and sub lines to be described below. One connection line HL may include one horizontal line and one sub-line, which will be described below.

One end of each of the connection lines HL may be connected to a corresponding one of the first vertical line portions DLa, and another end of each of the connection lines HL may be connected to one node of the group of connection nodes 160 to be described below. In one or more embodiments, when the other end of each of the connection lines HL is connected to a corresponding node from among nodes included in the group of connection nodes 160, the other end may also be connected to the corresponding node through a separate bridge line. For example, a bridge line may be a portion of the connection line HL, the portion extending toward the peripheral area PA. As another example, the bridge line is a separate line located on a different layer from that of the connection line HL, and may be electrically connected to the connection line HL in the peripheral area PA.

Each of the connection lines HL may include a horizontal line portion HLa and a sub line portion HLb.

The horizontal line portion HLa of each of the connection lines HL may extend in a row direction (e.g., ±x direction) to be connected to each of the first vertical line portions DLa. The horizontal line portion HLa of each of the connection lines HL may be parallel to the gate line GL. The gate line GL may mean a gate line to be described below.

Although FIG. 1 shows that the horizontal line portion HLa of each of the connection lines HL is directly connected to corresponding first vertical line portions DLa, the disclosure is not limited thereto. As one or more other embodiments, each of the connection lines HL may further include an additional portion, and the additional portion of the connection line HL may be a wiring or conductive material for electrically connecting the first vertical line portion DLa and the horizontal line portion HLa of the connection line HL to each other.

At least a portion of the horizontal line portion HLa of each of the connection lines HL may overlap the second area AR2, and at least another portion of the horizontal line portion HLa of each of the connection lines HL may overlap the first area AR1.

The sub line portion HLb of each of the connection lines HL may be arranged on a side of the virtual line €. As shown in FIG. 1, the sub line portion HLb of each of the connection lines HL may overlap the second area AR2, so the sub line portion HLb may be positioned adjacent to the second vertical line portion DLb. The sub line portion HLb of each of the connection lines HL may extend in a column direction (e.g., ±y direction) to be away from the data driver 150 to be described below. The sub line portion HLb of each of the connection lines HL may be parallel to the second vertical line portion DLb.

The second vertical line portions DLb may be data lines other than the first vertical line portions DLa. The second vertical line portions DLb may be connected to corresponding nodes among nodes of the group of connection nodes 160.

In one or more embodiments, when each of the second vertical line portions DLb is connected to a corresponding node among the nodes of the group of connection nodes 160, the second vertical line portion DLb may also be connected to the corresponding node through a separate bridge line. For example, the bridge line may be a portion of the second vertical line portion DLb, the portion extending toward the peripheral area PA. As another example, the bridge line is a separate line located on a different layer from that of the second vertical line portion DLb, and may be electrically connected to the second vertical line portion DLb in the peripheral area PA.

Figure 2:
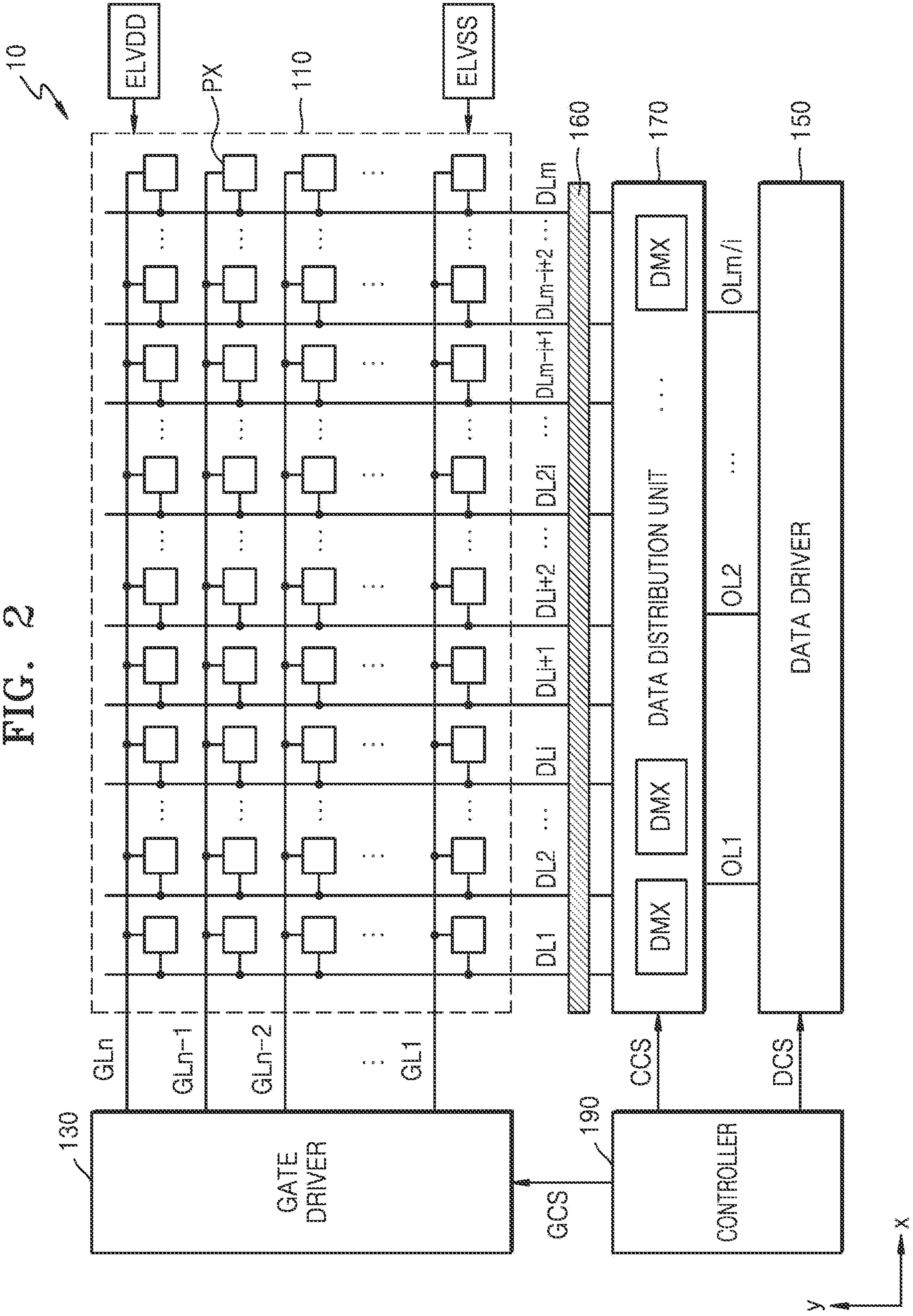
FIG. 2 is a conceptual diagram schematically illustrating the display apparatus of FIG. 1.

FIG. 2 is a conceptual diagram schematically illustrating the display apparatus of FIG. 1.

As shown in FIG. 2, the display apparatus 10 may include a display (e.g., a pixel unit) 110, a gate driver 130, the data driver 150, the data distributor 170, and a controller 190.

The display 110 in which a plurality of pixels PX are arranged may be provided in the display area DA. The gate driver 130, the data driver 150, the data distributor 170, and the controller 190 may be provided in the peripheral area PA.

Each of the plurality of pixels PX may be connected to a corresponding gate line among a plurality of gate lines GL1 to GLn and a corresponding data line among a plurality of data lines DL1 to DLm.

Each of the plurality of gate lines GL1 to GLn may extend in the second direction (e.g., x direction, row direction) to be connected to the pixels PX positioned in the same row. Each of the plurality of gate lines GL1 to GLn may transfer a gate signal to the pixels PX in the same row. Each of the plurality of data lines DL1 to DLm may extend in the first direction (e.g., y direction, column direction) to be connected to the pixels PX positioned in the same column.

The gate driver 130 may be connected to the plurality of gate lines GL1 to GLn, may generate a gate signal (or a scan signal) in response to a gate driving control signal GCS from the controller 190, and may sequentially supply the generated gate signal to the plurality of gate lines GL1 to GLn. When a gate signal is sequentially supplied to the plurality of gate lines GL1 to GLn, the pixels PX may be selected in units of rows. Data lines DL1 to DLm may respectively transfer data signals to the pixels PX of selected rows. A gate line may be connected to a gate of a transistor included in the pixel PX. The gate signal may be a gate control signal to control turn-on and turn-off of a transistor connected to a gate line. The gate signal may be a square wave signal in which an on-voltage, at which the transistor may be turned on, and an off-voltage, at which the transistor may be turned off, are repeated.

The data driver 150 may be connected to a plurality of output lines OL1 to OLm/i, and the plurality of output lines OL1 to OLm/i may be connected to a plurality of data lines DL1 to DLm through the data distributor 170. The data driver 150 may convert an image signal into a data signal in the form of voltage or current according to a data driving control signal DCS input from the controller 190. The data driver 150 may supply a data signal to the data distributor 170 through the plurality of output lines OL1 to OLm/i.

The data distributor 170 may be connected between the plurality of output lines OL1 to OLm/i and the plurality of data lines DL1 to DLm. The data distributor 170 may include m/i (where i is a natural number of 2 or more) demultiplexers DMX including a plurality of switches. That is, the data distributor 170 may have the same number of demultiplexers DMX as the number of output lines. One end of the demultiplexer DMX may be connected to one corresponding output line among the plurality of output lines OL1 to OLm/i. Also, another end of the demultiplexer DMX may be connected to i data lines. The demultiplexer DMX may supply a data signal supplied from an output line to i data lines. Because the number of output lines is less than the number of data lines, due to using the demultiplexer DMX, the number of output lines connected to the data driver 150 may be reduced to reduce manufacturing cost. The demultiplexer DMX may include a plurality of switches respectively connected to corresponding output lines and i data lines.

The group of connection nodes 160 may be arranged between the display 110 and the data distributor 170. The group of connection nodes 160 may include nodes for electrically connecting the plurality of data lines DL1 to DLn connected to the pixels and the data distributor 170 to each other. For example, one demultiplexer DMX may include at least two switches, and one node of the group of connection nodes 160 may electrically connect one of the at least two switches and one data line among the plurality of data lines DL1 to DLn to each other.

The controller 190 may generate the data driving control signal DCS and a gate driving control signal GCS in response to sync signals supplied from the outside. The controller 190 may output the data driving control signal DCS to the data driver 150, and may output the gate driving control signal GCS to the gate driver 130. The controller 190 may output a distribution control signal CCS to the data distributor 170, and the data distributor 170 may selectively connect the output lines OL1 to OLm/i and the plurality of data lines DL1 to DLm to each other in response to the distribution control signal CCS. The controller 190 may output i distribution control signals CCS to each demultiplexer DMX so that i data signals supplied to one output line are supplied to i data lines in a time-division manner. The i distribution control signals CCS may be sequentially output without overlapping each other.

The gate driver 130, the data distributor 170, and the controller 190 may be directly formed on the substrate 200. The data driver 150 may be located on a flexible printed circuit board (FPCB) electrically connected to a pad arranged on one side of the substrate 200. In one or more other embodiments, the data driver 150 may be directly located on the substrate 200 in a chip-on-glass (COG) or chip-on-plastic (COP) method.

When the display apparatus 10 is an organic light-emitting display apparatus, a first power supply voltage ELVDD and a second power supply voltage ELVSS may be supplied to the pixels PX of the display apparatus 10. The first power supply voltage ELVDD may be a high-level voltage provided to a first electrode (pixel electrode or anode electrode) of a display element (light-emitting element) included in each pixel PX. The second power supply voltage ELVSS may be a low-level voltage provided to a second electrode (opposite electrode or cathode electrode) of a display element included in each pixel PX. The first power supply voltage ELVDD and the second power supply voltage ELVSS may be driving voltages for allowing the plurality of pixels PX to emit light.

Hereinafter, the display apparatus 10 according to one or more embodiments is described as an organic light-emitting display apparatus as an example, but the display apparatus of the disclosure is not limited thereto. In one or more other embodiments, the display apparatus 10 of the disclosure may be a display apparatus, such as an inorganic light-emitting display apparatus of an inorganic electroluminescence (EL) display apparatus, or a quantum dot light-emitting display apparatus.

Figure 3:
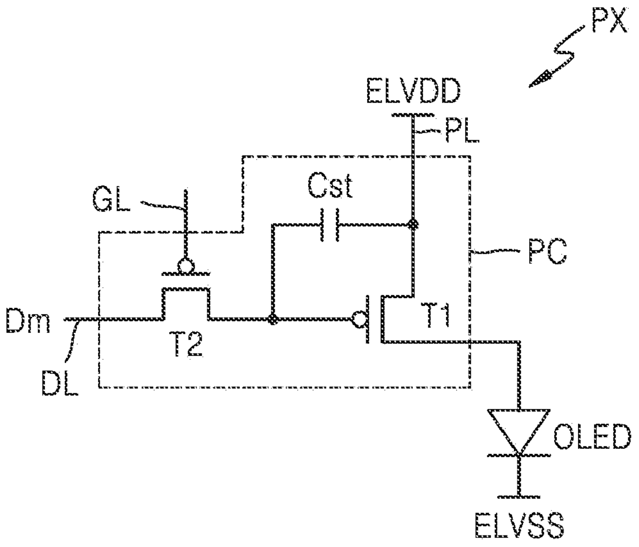
FIG. 3 is an equivalent circuit diagram schematically illustrating a pixel of a display panel according to one or more embodiments.

FIG. 3 is an equivalent circuit diagram schematically illustrating a pixel of a display panel according to one or more embodiments.

Referring to FIG. 3, the pixel PX may include a pixel circuit PC connected to a gate line GL and a data line DL, and an organic light-emitting diode OLED connected to the pixel circuit PC.

The pixel circuit PC may include a driving transistor T1, a scan transistor T2, and a storage capacitor Cst. The driving transistor T1 and the scan transistor T2 may be formed as thin-film transistors.

The scan transistor T2 may be connected to the gate line GL and the data line DL, and may be configured to transfer, to the driving transistor T1, a data voltage Dm input through the data line DL in synchronization with a scan signal input through the gate line GL.

The storage capacitor Cst may be connected to the scan transistor T2 and a driving voltage line PL, and may store a voltage corresponding to a difference between the data voltage Dm received from the scan transistor T2 and the first power supply voltage ELVDD supplied to the driving voltage line PL.

The driving transistor T1 may be connected to the driving voltage line PL and the storage capacitor Cst, and may control the magnitude of a driving current flowing from the driving voltage line PL to the organic light-emitting diode OLED, in accordance with a voltage value stored in the storage capacitor Cst. The organic light-emitting diode OLED may emit light having brightness corresponding to the magnitude of the driving current, according to the driving current.

Although FIG. 3 illustrates that the pixel circuit PC includes two transistors and one storage capacitor, the disclosure is not limited thereto. For example, the pixel circuit PC may include three or more transistors and/or two or more storage capacitors. In one or more embodiments, the pixel circuit PC may include seven transistors and one storage capacitor.

Figure 4:
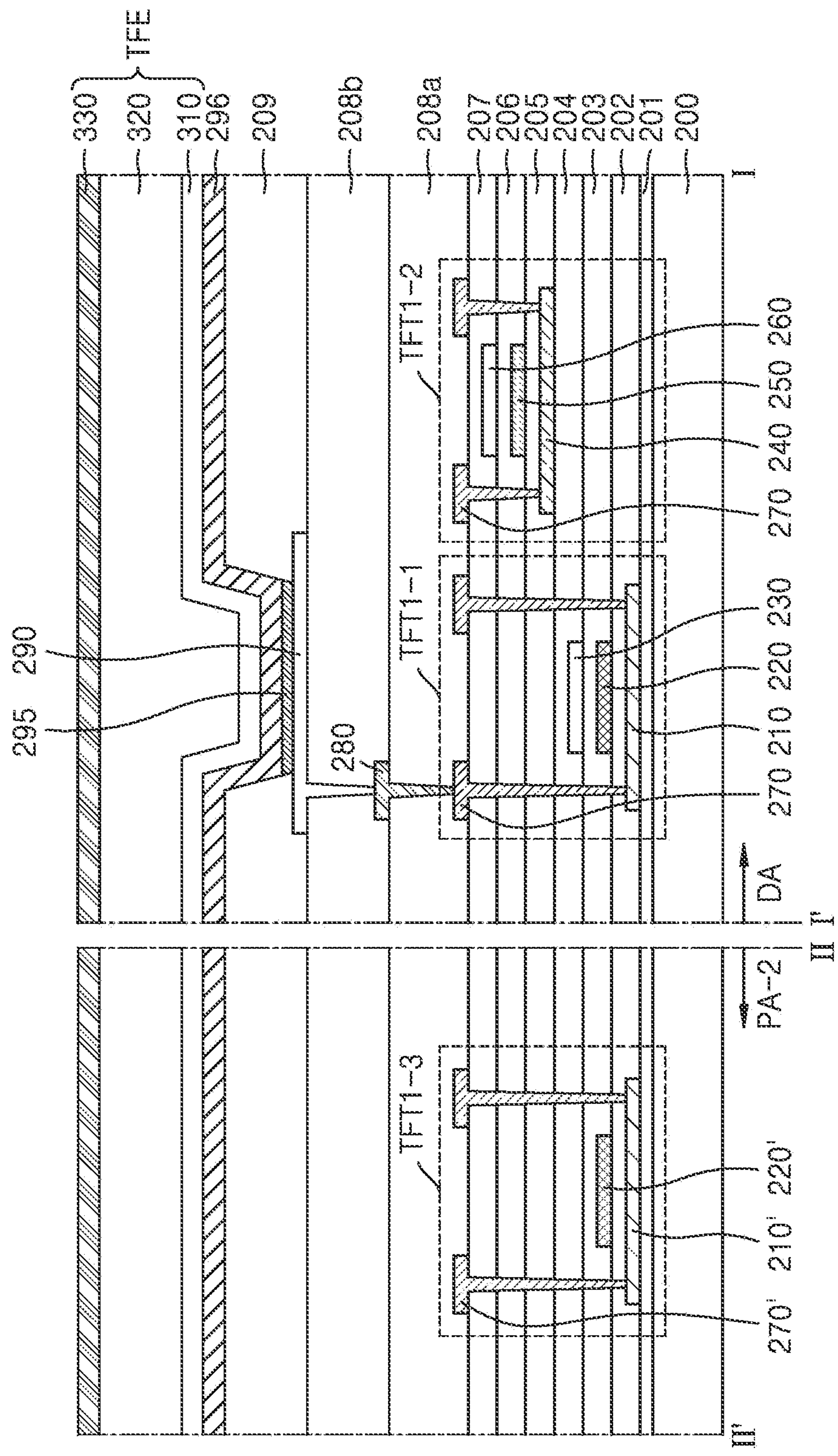
FIG. 4 shows schematic cross-sectional views of the display apparatus of FIG. 1, respectively taken along the lines I-I' and II-II' of FIG. 1.

FIG. 4 shows schematic cross-sectional views of the display apparatus of FIG. 1, respectively taken along the lines I-I' and II-II'.

The substrate 200 may include areas corresponding to the display area DA and to the peripheral area PA that is outside the display area DA, as described above. The substrate 200 may include various materials, which are flexible or bendable. For example, the substrate 200 may include glass, metal, or a polymer resin. Also, the substrate 200 may include a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 200 may have a multi-layered structure including two layers, which include the polymer resin, and also including a barrier layer including an inorganic material (for example, silicon oxide, silicon nitride, silicon oxynitride, or the like) arranged between the two layers, and various modifications may be made.

A buffer layer 201 may be on the substrate 200. The buffer layer 201 may function as a barrier layer and/or a blocking layer configured to reduce or prevent impurity ions from diffusing, reduce or prevent moisture or external air from penetrating, and planarize the surface of the substrate 200. The buffer layer 201 may include silicon oxide, silicon nitride, or silicon oxynitride. Also, the buffer layer 201 may adjust a heat supply rate during a crystallization process for forming first semiconductor layers 210 and 210', so that the first semiconductor layers 210 and 210' are uniformly crystallized.

The first semiconductor layers 210 and 210' may be on the buffer layer 201. The first semiconductor layers 210 and 210' may each include polysilicon, and may each include a channel area not doped with an impurity, and a source area and a drain area, which are respectively formed by doping impurities on respective sides of the channel area. Here, the impurity varies depending on the type of thin-film transistor, and may be an N-type impurity or a P-type impurity.

A first gate-insulating film 202 may be on the first semiconductor layers 210 and 210'. The first gate-insulating film 202 may be configured to secure the insulation between a first gate layer 220, to be described below, and the first semiconductor layers 210 and 210'. The first gate-insulating film 202 may include an inorganic material, such as silicon oxide, silicon nitride, and/or silicon oxynitride, and may be between the first semiconductor layers 210 and 210' and the first gate layer 220 to be described below. Also, the first gate-insulating film 202 may have a shape corresponding to the entire surface of the substrate 200, and may also have a structure in which contact holes are formed in a portion thereof (e.g., a predetermined portion thereof). As such, an insulating film including an inorganic material may be formed through chemical vapor deposition (CVD) or atomic layer deposition (ALD). The above description is similar to the embodiments and modification examples thereof to be described below.

The first gate layer 220 may be on the first gate-insulating film 202. The first gate layer 220 may be arranged at a position vertically overlapping the first semiconductor layers 210 and 210', and may include at least one metal from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and/or copper (Cu).

A first' gate layer 220' may be on the first gate-insulating film 202, but may be arranged in the second peripheral area PA-2 of the peripheral area PA. The first' gate layer 220' may be located on the same layer as the first gate layer 220, and may include the same material as the first gate layer 220. The first' gate layer 220' may be concurrently or substantially simultaneously formed in the same process as the first gate layer 220.

A first interlayer insulating film 203 may be on the first gate layer 220. The first interlayer insulating film 203 may cover the first gate layer 220. The first interlayer insulating film 203 may include an inorganic material. For example, the first interlayer insulating film 203 may include a metal oxide or a metal nitride, and, for example, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZrO_2$), or the like. The first interlayer insulating film 203 may include a double structure of $SiO_x/SiN_y$ or $SiN_x/SiO_y$ in some embodiments.

A second gate layer 230 may be on the first interlayer insulating film 203. In some cases, the second gate layer 230 may also be omitted.

The second gate layer 230 may be arranged at a position vertically overlapping the first gate layer 220. Although omitted for convenience of description, unlike that shown in FIG. 4, in some cases, a second' gate layer that is concurrently or substantially simultaneously formed with the second gate layer 230 may be located above the first gate layer 220' arranged the second peripheral area PA-2 of the peripheral area PA.

The second gate layer 230 may include at least one metal from among Mo, Al, Pt, Pd, Ag, Mg, Au, Ni, Nd, Ir, Cr, Li, Ca, Ti, W, and/or Cu.

In some cases, the second gate layer 230 may form a storage capacitor with the first gate layer 220. The first gate layer 220 may include a first electrode of a storage capacitor, and the second gate layer 230 may include a second electrode of the storage capacitor.

A second interlayer insulating film 204 may be on the second gate layer 230. The second interlayer insulating film 204 may cover the second gate layer 230. The second interlayer insulating film 204 may include an inorganic material. For example, the second interlayer insulating film 204 may include a metal oxide or a metal nitride, and, for example, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZrO_2$), or the like. The second interlayer insulating film 204 may include a double structure of $SiO_x/SiN_y$ or $SiN_x/SiO_y$ in some embodiments.

A second semiconductor layer 240 may be on the second interlayer insulating film 204. The second semiconductor layer 240 may include polysilicon or silicon oxide, and may mainly include silicon oxide. The second semiconductor layer 240 may include a channel area not doped with an impurity, and a source area and a drain area, which are respectively formed by doping impurities on both sides of the channel area. Here, the impurity varies depending on the type of thin-film transistor, and may be an N-type impurity or a P-type impurity.

A second gate-insulating film 205 may be on the second semiconductor layer 240. The second gate-insulating film 205 may be configured to secure the insulation between the second semiconductor layer 240 and a third gate layer 250 to be described below. The second gate-insulating film 205 may include an inorganic material, such as silicon oxide, silicon nitride, and/or silicon oxynitride, and may be between the second semiconductor layer 240 and a third gate layer 250 to be described below. Also, the second gate-insulating film 205 may have a shape corresponding to the entire surface of the substrate 200, and may also have a structure in which contact holes are formed in a portion thereof (e.g., a predetermined portion thereof). As such, an insulating film including an inorganic material may be formed through CVD or ALD. The above description is similar to the embodiments and modification examples thereof to be described below.

The third gate layer 250 may be on the second gate-insulating film 205. The third gate layer 250 may be arranged at a position vertically overlapping the second semiconductor layer 240, and may include at least one metal from among Mo, Al, Pt, Pd, Ag, Mg, Au, Ni, Nd, Ir, Cr, Li, Ca, Ti, W, and/or Cu.

A third interlayer insulating film 206 may be on the third gate layer 250. The third interlayer insulating film 206 may cover the third gate layer 250. The third interlayer insulating film 206 may include an inorganic material. For example, the third interlayer insulating film 206 may include a metal oxide or a metal nitride, and, for example, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZrO_2$), or the like. The third interlayer insulating film 206 may include a double structure of $SiO_x/SiN_y$ or $SiN_x/SiO_y$ in some embodiments.

A fourth gate layer 260 may be on the third interlayer insulating film 206. In some cases, the fourth gate layer 260 may be omitted.

The fourth gate layer 260 may be arranged at a position vertically overlapping the third gate layer 250, and may include at least one metal from among Mo, Al, Pt, Pd, Ag, Mg, Au, Ni, Nd, Ir, Cr, Li, Ca, Ti, W, and/or Cu.

In some cases, the fourth gate layer 260 may form a storage capacitor with the third gate layer 250. The fourth gate layer 260 may include a first electrode of a storage capacitor, and the third gate layer 250 may include a second electrode of the storage capacitor.

A fourth interlayer insulating film 207 may be on the fourth gate layer 260. The fourth interlayer insulating film 207 may cover the fourth gate layer 260. The fourth interlayer insulating film 207 may include an inorganic material. For example, the fourth interlayer insulating film 207 may include a metal oxide or a metal nitride, and, for example, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZrO_2$), or the like. The fourth interlayer insulating film 207 may include a double structure of $SiO_x/SiN_y$ or $SiN_x/SiO_y$ in some embodiments.

A first conductive layer 270 may be on the fourth interlayer insulating film 207. The first conductive layer 270 may function as an electrode connected to a source/drain area of each of the first semiconductor layers 210 and 210' through a through hole penetrating the first gate-insulating film 202 to the fourth interlayer insulating film 207.

The first conductive layer 270 may also function as an electrode connected to the source/drain area of the second semiconductor layer 240 through a through hole penetrating the second gate-insulating film 205 to the fourth interlayer insulating film 207.

The first conductive layer 270 may include at least one metal selected from among Al, Pt, Pd, Ag, Mg, Au, Ni, Nd, Ir, Cr, Li, Ca, Mo, Ti, W, and/or Cu. For example, the first conductive layer 270 may include a Ti layer, an Al layer, and/or a Cu layer.

A first' conductive layer 270', which is located on the same layer as the first conductive layer 270 and is arranged in the first peripheral area PA-1, may be on the fourth interlayer insulating film 207. The first' conductive layer 270' may be located on the same layer as the first conductive layer 270 and may include the same material as the first conductive layer 270. Also, the first' conductive layer 270' may be concurrently or substantially simultaneously formed in the same process as the first conductive layer 270. As a result, the structure of the first' conductive layer 270' may be the same as the structure of the first conductive layer 270.

The first conductive layer 270 and/or the first' conductive layer 270' may configure data lines or at least some lines to be described below. Also, drawings to be described below show data lines/lines in plan view for convenience of explanation, and the data lines/lines may include the first conductive layer 270 and/or the first' conductive layer 270'.

A first organic insulating layer 208*a* may be on the first conductive layer 270. The first organic insulating layer 208*a* may be an organic insulating layer covering an upper portion of the first conductive layer 270, and having a substantially flat upper surface to function as a planarization film. The first organic insulating layer 208*a* may include, for example, an organic material, such as acryl, benzocyclobutene (BCB), hexamethyldisiloxane (HMDSO), or the like. The first organic insulating layer 208*a* may be modified in various ways, such as being configured as a single layer or a multi-layer.

A second conductive layer 280 may be on the first organic insulating layer 208*a*. The second conductive layer 280 may function as an electrode connected to a source/drain area of a semiconductor layer through a through hole included in the first organic insulating layer 208*a*. The second conductive layer 280 may include at least one metal selected from among Al, Pt, Pd, Ag, Mg, Au, Ni, Nd, Ir, Cr, Li, Ca, Mo, Ti, W, and/or Cu. For example, the second conductive layer 280 may include a Ti layer, an Al layer, and/or a Cu layer.

The first conductive layer 270, the first' conductive layer 270', and the second conductive layer 280 may configure data lines or at least some lines to be described below. Also, FIGS. 8 to 10 to be described below show data lines/lines in plan view for convenience of explanation, and the data lines/lines may include the first conductive layer 270, the first' conductive layer 270', and the second conductive layer 280.

A second organic insulating layer 208*b* may be on the second conductive layer 280. The second organic insulating layer 208*b* may be an organic insulating layer covering an upper portion of the second conductive layer 280 and having a substantially flat upper surface to function as a planarization film. The second organic insulating layer 208*b* may include, for example, an organic material, such as acryl, BCB, HMDSO, or the like. The second organic insulating layer 208*b* may be modified in various ways, such as being configured as a single layer or a multi-layer.

Also, in one or more other embodiments, an additional conductive layer and an additional insulating layer may be between a conductive layer and a pixel electrode, and may be applied to various embodiments. At this time, the additional conductive layer may include the same material as the above-described conductive layer, and may have the same layer structure. The additional insulating layer may include the same material as the above-described organic insulating layer, and may have the same layer structure.

A pixel electrode 290 may be on the second organic insulating layer 208*b*. The pixel electrode 290 may be connected to the second conductive layer 280 through a contact hole formed in the second organic insulating layer 208*b*. A display element may be on the pixel electrode 290. An organic light-emitting diode (OLED) may be used as the display element. That is, the OLED may be, for example, on the pixel electrode 290. The pixel electrode 290 may include a transparent conductive layer including a transparent conductive oxide, such as ITO, $In_2O_3$, IZO, or the like, and a reflective layer including a metal, such as Al, Ag, or the like. For example, the pixel electrode 290 may have a triple-layered structure of ITO/Ag/ITO.

A pixel-defining layer 209 may be on the second organic insulating layer 208*b*, and may be arranged to cover an edge(s) of the pixel electrode 290. That is, the pixel-defining layer 209 may cover the edge of the pixel electrode 290. The pixel-defining layer 209 may have an opening portion corresponding to the pixel PX, and the opening portion may be formed to expose at least a central portion of the pixel electrode 290. The pixel-defining layer 209 may include, for example, an organic material, such as polyimide, HMDSO, or the like.

An intermediate layer 295 and an opposite electrode 296 may each be on the opening portion of the pixel-defining layer 209. The intermediate layer 295 may include a low-molecular-weight material or a polymer material. When the intermediate layer 295 includes a low-molecular-weight material, the intermediate layer 295 may include a hole injection layer, a hole transport layer, an emission layer, an electron transport layer, and/or an electron injection layer. When the intermediate layer 295 includes a polymer material, the intermediate layer 295 may usually have a structure including a hole transport layer and an emission layer.

The opposite electrode 296 may include a transparent conductive layer including a transparent conductive oxide, such as ITO, $In_2O_3$, IZO, or the like. The pixel electrode 290 may be used as an anode, and the opposite electrode 296 may be used as a cathode. The polarities of the electrodes may be applied in reverse.

The structure of the intermediate layer 295 is not limited to the above, and may have various structures. For example, at least one of layers configuring the intermediate layer 295 may be integrally formed with the opposite electrode 296. In one or more other embodiments, the intermediate layer 295 may include a layer patterned to correspond to each of a plurality of pixel electrodes 290.

The opposite electrode 296 may be arranged in the display area DA, and may be arranged to cover the entire surface of the display area DA. The opposite electrode 296 may be in electrical contact with a common power supply line in the peripheral area PA. In one or more embodiments, the opposite electrode 296 may extend to a blocking wall. A thin-film encapsulation layer TFE may entirely cover the display area DA, and may extend toward the peripheral area PA to cover at least a portion of the peripheral area PA. The thin-film encapsulation layer TFE may extend to the outside of the common power supply line.

The thin-film encapsulation layer TFE may include a first inorganic encapsulation layer 310, a second inorganic encapsulation layer 330, and an organic encapsulation layer 320 therebetween. The first inorganic encapsulation layer 310 and the second inorganic encapsulation layer 330 may each include one or more inorganic materials from among aluminum oxide, titanium oxide, tantalum oxide, hafnium oxide, zinc oxide, silicon oxide, silicon nitride, and/or silicon oxynitride. The first inorganic encapsulation layer 310 and the second inorganic encapsulation layer 330 may each be a single layer or a multi-layer, each including the material described above.

The first inorganic encapsulation layer 310 and the second inorganic encapsulation layer 330 may include the same material, or may include different materials. The thickness of the first inorganic encapsulation layer 310 and the thickness of the second inorganic encapsulation layer 330 may be different from each other. A thickness of the first inorganic encapsulation layer 310 may be greater than a thickness of the second inorganic encapsulation layer 330. Alternatively, the thickness of the second inorganic encapsulation layer 330 may be greater than the thickness of the first inorganic encapsulation layer 310, or the first inorganic encapsulation layer 310 and the second inorganic encapsulation layer 330 may have the same thickness. The organic encapsulation layer 320 may include a monomer-based material or a polymer-based material.

The polymer-based material may include an acrylic resin, an epoxy resin, polyimide, polyethylene, or the like. In one or more embodiments, the organic encapsulation layer 320 may include acrylate. A blocking wall may be positioned in the peripheral area PA of the substrate 200.

The blocking wall may be arranged to surround the display area DA, and may reduce or prevent the likelihood of the organic encapsulation layer 320 of the thin-film encapsulation layer TFE overflowing to the outside of the substrate 200. Accordingly, the organic encapsulation layer 320 may be in contact with an inner side surface of the blocking wall, wherein the inner side surface is toward the display area DA. At this time, the organic encapsulation layer 320 being in contact with the inner side surface of the blocking wall may be understood as that the first inorganic encapsulation layer 310 being between the organic encapsulation layer 320 and the blocking wall, and the organic encapsulation layer 320 is in contact with the first inorganic encapsulation layer 310. The first inorganic encapsulation layer 310 and the second inorganic encapsulation layer 330 each may be located above a blocking wall, and may extend toward an edge of the substrate 200.

However, in some cases, a plurality of blocking walls may also be included. As shown in FIG. 4, in the display area DA, a first-1 thin-film transistor TFT1-1 and a first-2 thin-film transistor TFT1-2, which are configured to implement a pixel circuit, may be arranged.

Also, a first-3 thin-film transistor TFT1-3, which corresponds to a switch (e.g., switch unit) included in the demultiplexer DMX to be described below, may be arranged in the first peripheral area PA-1 to distribute data. The first-3 thin-film transistor TFT1-3 may also be concurrently or substantially simultaneously formed in the same process as the first-1 thin-film transistor TFT1-1. That is, the first-3 thin-film transistor TFT1-3 may be located on the same layer as the first-1 thin-film transistor TFT1-1. However, in some cases, a component corresponding to the second gate layer 230 of the first-1 thin-film transistor TFT1-1 may be omitted in the first-3 thin-film transistor TFT1-3.

Because a separate capacitor structure may not be required to implement the demultiplexer DMX. In one or more other embodiments, the first' conductive layer 270' and the first conductive layer 270 may be electrically connected to each other.

Figure 5:
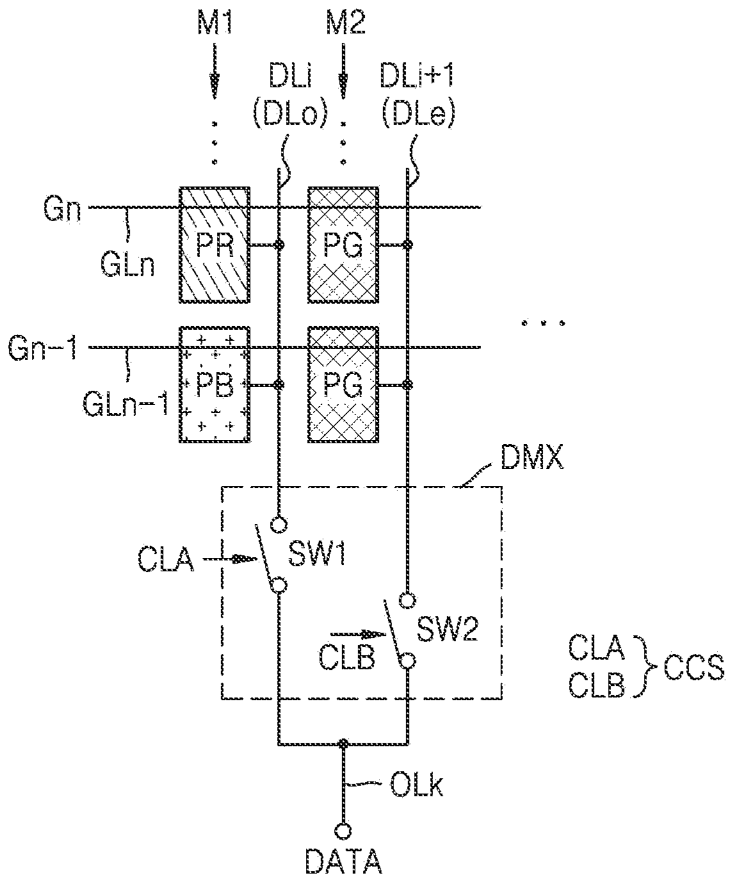
FIG. 5 is a diagram for explaining an example of a demultiplexer included in a data distributor of FIG. 2.

For example, to electrically connect the first' conductive layer 270' and the first conductive layer 270 to each other, a bridge line may be added on the same layer as the second conductive layer 280. For example, to electrically connect the first conductive layer 270' and the first conductive layer 270 to each other, an additional line connecting the first' conductive layer 270' and the first conductive layer 270 to each other may be located on the same layer as the first' conductive layer 270' or the first conductive layer 270. For example, to electrically connect the first' conductive layer 270' and the first conductive layer 270 to each other, the first' conductive layer 270' and the first conductive layer 270 may also be formed as patterns connected to each other from the beginning (e.g., the first' conductive layer 270' and the first conductive layer 270 may be integrally formed). FIG. 5 is a diagram for explaining an example of a demultiplexer included in a data distributor of FIG. 2.

1 FIG. 5 shows an example of the demultiplexer DMX selectively connecting a k-th output line OLk to a pair of an i-th data line DLi and an i+1-th data line DLi+1, which are adjacent to each other.

The demultiplexer DMX may include a first switch SW1 and a second switch SW2. For example, a switch of the demultiplexer DMX may be implemented by a thin-film transistor, such as the first-3 thin-film transistor TFT1-3 of FIG. 4.

The first switch SW1 may be provided between the k-th output line OLk and the i-th data line DLi. The first switch SW1 may connect the k-th output line OLk and the i-th data line DLi to each other by a first control signal CLA, and may apply a data signal DATA applied to the k-th output line OLk to the i-th data line DLi.

The second switch SW2 may be provided between the k-th output line OLK and the i+1-th data line DLi+1. The second switch SW2 may connect the k-th output line OLk and the i+1-th data line DLi+1 to each other by a second control signal CLB, and may apply the data signal DATA applied to the k-th output line OLk to the i+1-th data line DLi+1.

The distribution control signal CCS may include the first control signal CLA and the second control signal CLB. The first control signal CLA and the second control signal CLB may be alternately applied at different timings without overlapping each other. However, in some cases, the first control signal CLA and the second control signal CLB may have some overlapping sections due to electrical lagging, but the first control signal CLA and the second control signal CLB are generally alternately applied without overlapping each other. The pixels PX may include a first pixel PR, a second pixel PB, and a third pixel PG, which emit different colors of light from each other.

For example, the first pixel PR may emit red visible light, the second pixel PB may emit blue visible light, and the third pixel PG may emit green visible light. For example, when the pixels PX are arranged in a diamond structure, a plurality of first pixels PR and a plurality of second pixels PB may be alternately connected to one data line, or may be defined as one pixel group. Also, when the pixels PX are arranged in a diamond structure, a plurality of third pixels PG may be connected to one data line, or may be defined as one pixel group. In one or more embodiments, the first pixel PR and the second pixel PB may be alternately arranged in a column M1 in which the i-th data line DLi is arranged, and may be connected to the i-th data line DLi.

The third pixel PG may be repeatedly arranged in a column M2 in which the i+1-th data line DLi+1 is arranged, and may be connected to the i+1-th data line DLi+1. One of the i-th data line DLi and the i+1-th data line DLi+1 may be an odd data line DLo, and another one may be an even data line DLe. For example, as shown in FIG. 5, the i-th data line DLi may be the odd data line DLo, and the i+1-th data line DLi+1 may be the even data line DLe.

A pair of data lines connected to the demultiplexer DMX may be a pair of an odd data line and an even data line, which are arranged to be spaced apart from each other by one column. The first pixel PR may be a red-based pixel emitting red light, the second pixel PB may be a blue-based pixel emitting blue light, and the third pixel PG may be a green-based pixel emitting green light. FIG. 5 shows the pixels PX respectively connected to an n−1-th gate line GLn−1 arranged in an n−1 row, and to an n-th gate line GLn arranged in an n row. The n−1-th gate line GLn−1 and the n-th gate line GLn, which are shown in FIG. 5, may be the gate lines GL1 to GLn shown in FIG. 2.

Figure 6:
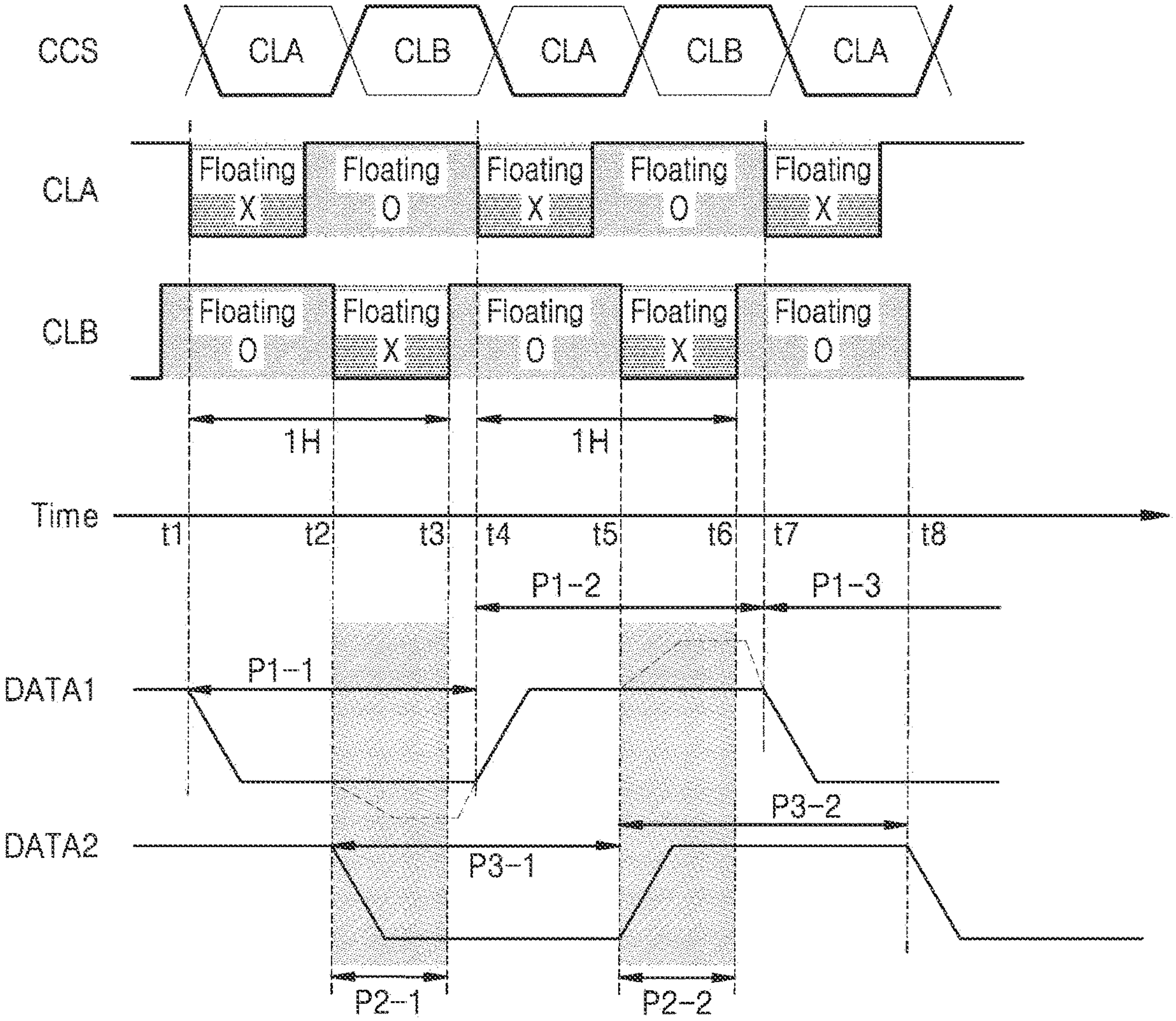
FIG. 6 is a diagram schematically illustrating signal interference in the display apparatus of FIG. 1.

FIG. 6 is a diagram schematically illustrating signal interference in the display apparatus of FIG. 1.

For reference, waveforms shown in FIG. 6 are shown based on the same time axis, and the unit of the time axis is omitted for convenience of description. For example, the unit of the time axis may be a second unit, such as ns, μs, ms, s, or the like, and the unit of the time axis may vary according to a driving program for driving the screen of the display apparatus 10 or a default setting value of a driving system. For reference, the unit of the vertical axis of the waveforms shown in FIG. 6 may be a voltage (V) or current (A) waveform.

The unit of the vertical axis of the waveforms may vary according to a driving method of the display apparatus 10, such as voltage driving or current driving, and the screen of the display apparatus 10 may be driven based on the height of a waveform or a change in signal by any driving method. That is, the unit of the vertical axis may vary according to a driving program for driving the screen of the display apparatus 10 or a default setting value of a driving system. For example, in the case of an organic light-emitting display apparatus mainly using current driving, the unit of the vertical axis of each of DATA1, DATA2, CLA, and CLB may be current (A). As shown in FIG. 6, the distribution control signal CCS may include the first control signal CLA and the second control signal CLB.

Referring to FIGS. 5 and 6 together, when the first control signal CLA is transferred, the first switch SW1 may be turned on, and the second switch SW2 may be turned off. As such, the first switch SW1 and the second switch SW2 may be alternately turned on/off every period 1H in which the first control signal CLA and the second control signal CLB are provided. In one or more embodiments, a line connected to the first switch SW1 is a first control line CL1 (refer to FIG. 7) to be described below, and the first control line CL1 may receive the first control signal CLA from the controller 190 to transfer the received first control signal CLA to the first switch SW1.

A line connected to the second switch SW2 is a second control line CL2 (refer to FIG. 7), and the second control line CL2 may receive the second control signal CLB from the controller 190 to transfer the received second control signal CLB to the second switch SW2. In one or more embodiments, one data line connected to the first switch SW1 may transfer a first data signal DATA1 to a corresponding pixel group, and another data line connected to the second switch SW2 may transfer a second data signal DATA2 to another corresponding pixel group.

In one or more embodiments, when the first switch SW1 is turned on by the first control signal CLA (e.g., a P1-1 period in FIG. 6), one data line connected to the first switch SW1 may receive a data signal. When the second switch SW2 is turned on by the second control signal CLB (e.g., a P3-1 period in FIG. 6), the other data line connected to the second switch SW2 may receive a data signal. When the second switch SW2 is turned on by the second control signal CLB, the first switch SW1 may be turned off. Conversely, when the first switch SW1 is turned on by the first control signal CLA, the second switch SW2 may be turned off.

On/off states may also concurrently or substantially simultaneously occur temporarily due to electrical lagging, but the first switch SW1 and the second switch SW2 may be oppositely driven in general. A floating state herein may mean a state in which electrical connection with the data driver 150 is temporarily disconnected, and in which an already injected data signal is maintained in a data line to which the data signal is transferred.

Herein, the floating state may be collectively used for a state of a data signal, or a state of a data line to which a data signal is transferred, or may be used interchangeably with a state of a data signal or a state of a data line to which a data signal is transferred. When in a floating state, a data line in the floating state cannot continuously receive a data signal from the data driver 150, so a data signal maintained in the data line in the floating state may be affected by electromagnetic fields generated from surrounding lines.

A line in a floating state may receive electrical interference from surrounding lines. That is, a signal of a line in a floating state may be coupled with a signal of a surrounding line. In one or more embodiments, when the second switch SW2 is turned on by the second control signal CLB, the first switch SW1 may be turned off, and the other data line connected to the second switch SW2 may receive a data signal.

When the first switch SW1 is turned off, one data line connected to the first switch SW1 may be in a floating state. Accordingly, when the gate line GL or the like described above is arranged around one data line connected to the first switch SW1, a data signal of the one data line may be interfered with by a gate signal (or a scan signal) or the like transferred through the gate line GL. In one or more embodiments, when the first switch SW1 is turned on by the first control signal CLA, the second switch SW2 may be turned off, and one data line connected to the first switch SW1 may receive a data signal.

When the second switch SW2 is turned off, the other data line connected to the second switch SW2 may be in a floating state. Accordingly, when the gate line GL or the like described above is arranged around the other data line connected to the second switch SW2, a data signal of the other data line may be interfered with by a gate signal (or a scan signal, which is the same below) transferred through the gate line GL. For example, one pixel of a corresponding pixel group connected to the one data line may be electrically connected to one gate line, and may be turned on/off according to a gate signal transferred by the one gate line.

A gate signal for turning on/off one pixel may interfere with a data signal in the floating state described above. In other words, a data signal for driving one pixel may be coupled with a gate signal for turning on/off the one pixel. As shown in FIG. 6, the first data signal DATA1 may be transferred to a corresponding pixel group along one data line, and when the one data line through which the first data signal DATA1 flows is in a floating state, a gate signal may turn on one sub-pixel in the corresponding pixel group.

The gate signal may have a change in voltage (or a change in current) for turning on/off the one pixel, and at this time, the change in voltage (or the change in current) of the gate signal may occur when the one data line through which the first data signal DATA1 flows is in the floating state. For example, a portion of the P1-1 period in FIG. 6, and a P2-1 period in which a pixel operated by the first data signal DATA1 is turned on by a gate signal, may overlap each other.

The P2-1 period may also overlap a period in which the one data line through which the first data signal DATA1 flows is in the floating state. For example, a portion of the P1-2 period in FIG. 6, and a P2-2 period in which a pixel operated by the first data signal DATA1 is turned on by a gate signal, may overlap each other.

The P2-2 period may also overlap a period in which the one data line through which the first data signal DATA1 flows is in the floating state. Accordingly, the first data signal DATA1 may be coupled with the gate signal in the floating state, and may be interfered with by the gate signal due to the coupling.

Such signal interference may affect the brightness of a pixel operated by the first data signal DATA1. Such a coupling phenomenon or signal interference may occur in the display apparatus 10 including the data distributor 170, which includes the demultiplexer DMX. On the contrary, the P2-1 period and the P2-2 period do not overlap a period in which the other data line through which the second data signal DATA2 flows is in the floating state.

Accordingly, the second data signal DATA2 may not be coupled with a gate signal in the floating state. Human eyes are most sensitive to a change in brightness of green light among three primary colors of light, followed by being sensitive to a change in brightness of red light, and are least sensitive to a change in brightness of blue light.

Accordingly, even if the data signal in the floating state is interfered with by being coupled with the scan signal, and if the data signal is changed by this interference, a line design in which human eyes may fail to notice a change in brightness according to the change of the data signal may be suitable. As a result, the second data signal DATA2 not coupled with a gate signal in the floating state is transferred to a pixel group including green-based pixels, and the first data signal DATA1 coupled with a scan signal in the floating state is transferred to a pixel group including red-based pixels and blue-based pixels, while the first data signal DATA1 may be input through the periphery of the blue-based pixels.

Figure 7:
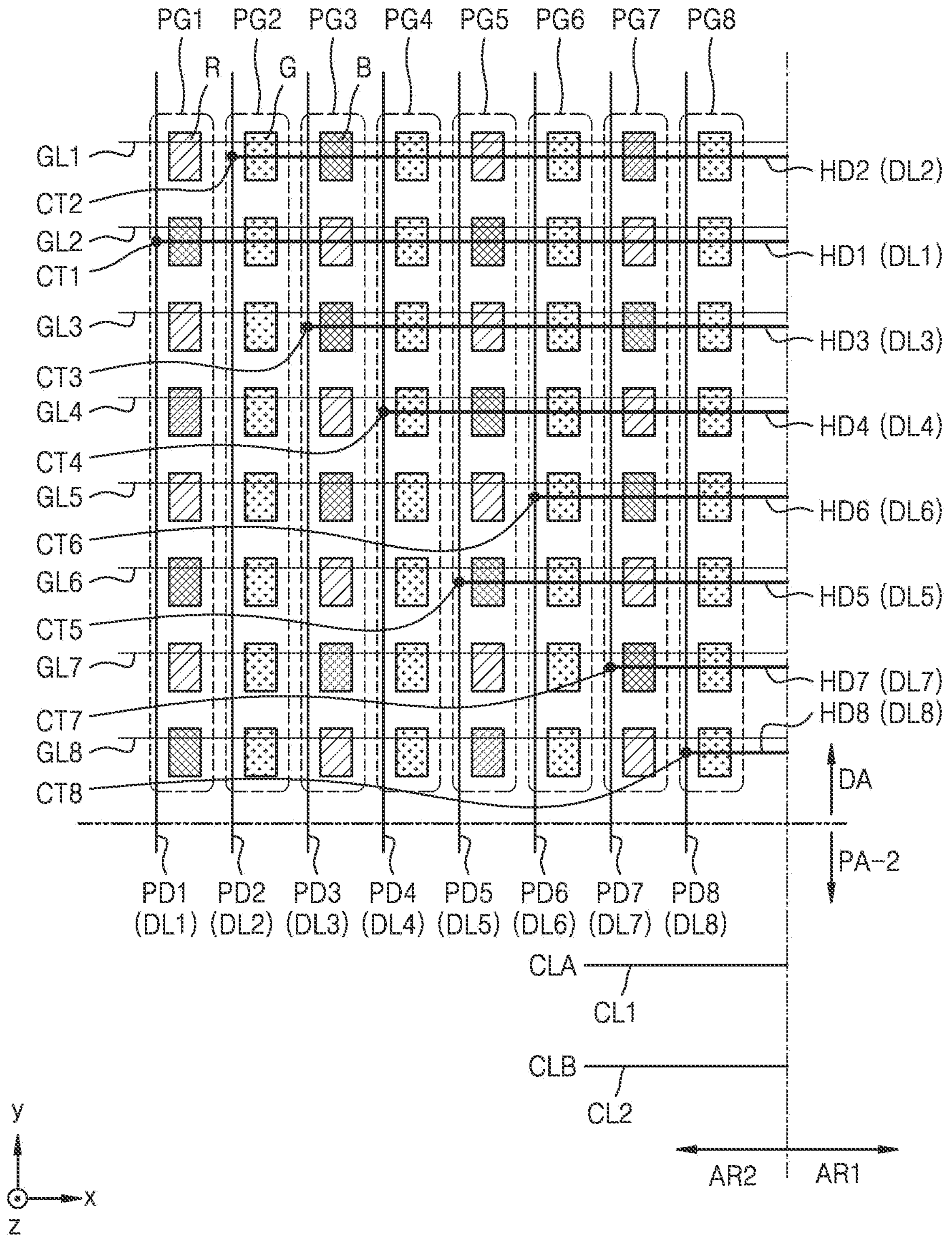
FIG. 7 is a schematic conceptual diagram mainly showing a second area of the display apparatus of FIG. 1.
Figure 8:
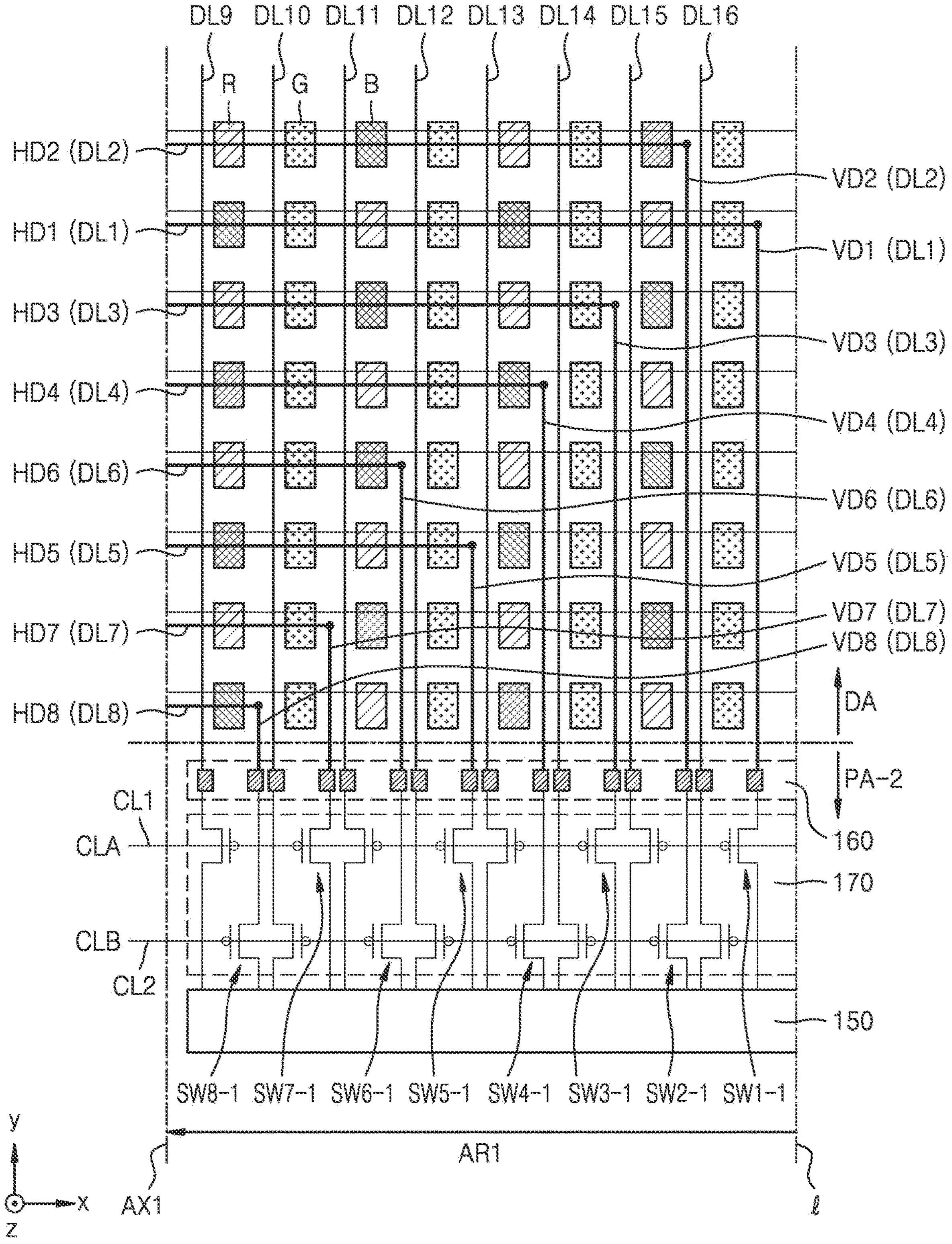
FIG. 8 is a schematic conceptual diagram mainly showing a first area of the display apparatus of FIG. 1.

FIG. 7 is a schematic conceptual diagram mainly showing the second area AR2 of the display apparatus of FIG. 1, and FIG. 8 is a schematic conceptual diagram mainly showing the first area AR1 of the display apparatus of FIG. 1.

In the descriptions of FIGS. 7 and 8, descriptions already given with reference above may be omitted. As shown in FIGS. 7 and 8, the display apparatus 10 according to one or more embodiments may include the substrate 200 (refer to FIG. 4), the plurality of pixels PX, a plurality of data lines DL, and the data distributor 170.

Also, the display apparatus 10 may further include a plurality of gate lines GL, the data driver 150, the group of connection nodes 160, the controller 190 (refer to FIG. 2), and a gate driver 130 (refer to FIG. 2). The plurality of pixels PX may include a plurality of pixel groups.

The plurality of pixels PX may include pixel groups arranged in the first area AR1 and pixel groups arranged in the second area AR2. The pixel groups arranged in the first area AR1 may receive data signals through data lines DL (or the second data line portions DLb of FIG. 1) nearly having a substantially straight line shape in plan view. However, the pixel groups arranged in the second area AR2 suitably use the data lines DL (or the first data line portions DLa of FIG. 1) in various forms to receive data signals from the data distributor 170. To provide data signals to the pixel groups arranged in the second area AR2, it is suitable to include a line shape extending from at least the first area AR1 to the second area AR2. As shown in FIG. 7, the plurality of pixels PX may be located on the substrate 200.

The plurality of pixels PX may include a first pixel group PG1 to an eighth pixel group PG8, which are arranged in a second direction, in the second area AR2. Although other pixel groups may be further arranged along a −x axis or +x axis, a description thereof is omitted for convenience of description, and eight pixel groups are mainly described.

The first pixel group PG1 may include red-based pixels and blue-based pixels, which are arranged in the first direction, in the first area AR1. The red-based pixels and the blue-based pixels may be alternately arranged in the first direction. A data line transferring a data signal to the first pixel group PG1 is defined as a first data line DL1.

The second pixel group PG2 may include green-based pixels, which are arranged in the first direction, in the first area AR1. The second pixel group PG2 may be spaced apart from the first pixel group PG1 in the +x-axis direction. A data line transferring a data signal to the second pixel group PG2 is defined as a second data line DL2. In plan view, the second pixel group PG2 may be arranged between the first pixel group PG1 and the third pixel group PG3 to be described below.

The third pixel group PG3 may include red-based pixels and blue-based pixels, which are arranged in the first direction, in the first area AR1. The red-based pixels and the blue-based pixels may be alternately arranged in the first direction. The third pixel group PG3 may be spaced apart from the second pixel group PG2 in the +x-axis direction. A data line transferring a data signal to the third pixel group PG3 is defined as a third data line DL3.

In plan view, the red-based pixels of the first pixel group PG1 and the blue-based pixels of the third pixel group PG3 may be alternately arranged in a second direction or x-axis direction. In plan view, the blue-based pixels of the first pixel group PG1 and the red-based pixels of the third pixel group PG3 may be alternately arranged in the second direction or x-axis direction.

The fourth pixel group PG4 may include green-based pixels, which are arranged in the first direction, in the first area AR1. The fourth pixel group PG4 may be spaced apart from the third pixel group PX3 in the +x-axis direction. A data line transferring a data signal to the fourth pixel group PG4 is defined as a fourth data line DL4.

The fifth pixel group PG5 may include red-based pixels and blue-based pixels, which are arranged in the first direction, in the first area AR1. The red-based pixels and the blue-based pixels may be alternately arranged in the first direction. The fifth pixel group PG5 may be spaced apart from the fourth pixel group PG4 in the +x-axis direction. A data signal transferring a data signal to the fifth pixel group PG5 is defined as a fifth data line DL5.

In plan view, the red-based pixels of the first pixel group PG1, the blue-based pixels of the third pixel group PG3, and the red-based pixels of the fifth pixel group PG5 may be alternately arranged in the second direction or x-axis direction. In plan view, the blue-based pixels of the first pixel group PG1, the red-based pixels of the third pixel group PG3, and the blue-based pixels of the fifth pixel group PG5 may be alternately arranged in the second direction or x-axis direction.

The sixth pixel group PG6 may include green-based pixels, which are arranged in the first direction, in the first area AR1. The sixth pixel group PG6 may be spaced apart from the fifth pixel group PG5 in the +x-axis direction. A data line transferring a data signal to the sixth pixel group PG6 is defined as a sixth data line DL6.

The seventh pixel group PG7 may include red-based pixels and blue-based pixels, which are arranged in the first direction, in the first area AR1. The red-based pixels and the blue-based pixels may be alternately arranged in the first direction. The seventh pixel group PG7 may be spaced apart from the sixth pixel group PG6 in the +x-axis direction. A data line transferring a data signal to the seventh pixel group PG7 is defined as a seventh data line DL7.

In plan view, the red-based pixels of the first pixel group PG1, the blue-based pixels of the third pixel group PG3, the red-based pixels of the fifth pixel group PG5, and the blue-based pixels of the seventh pixel group PG7 may be alternately arranged in the second direction or x-axis direction. In plan view, the blue-based pixels of the first pixel group PG1, the red-based pixels of the third pixel group PG3, the blue-based pixels of the fifth pixel group PG5, and the red-based pixels of the seventh pixel group PG7 may be alternately arranged in the second direction or x-axis direction.

The eighth pixel group PG8 may include green-based pixels, which are arranged in the first direction, in the first area AR1. The eighth pixel group PG8 may be spaced apart from the seventh pixel group PG7 in the +x-axis direction. A data line transferring the eighth pixel group PG8 is defined as an eighth data line DL8.

In addition, the display apparatus 10 may further include an n-th pixel group, and a data line transferring a data signal to the n-th pixel group is defined as an n-th data line.

The display apparatus 10 according to one or more embodiments may include the plurality of data lines DL respectively transferring data signals to the plurality of pixels PX.

Each of the plurality of data lines DL may include at least a portion extending in the first direction or y-axis direction, and a portion extending in the second direction or x-axis direction. The display apparatus 10 according to one or more embodiments may include the data distributor 170 for alternately transferring the data signal to at least one pair of data lines among the plurality of data lines DL.

The data distributor 170 may alternately transfer a data signal to at least one pair of data lines through the demultiplexer DMX described above. The plurality of data lines DL may include at least the first data line DL1, the second data line DL2, and the third data line DL3.

The first data line DL1 may include a first horizontal line HD1 extending in the second direction, and may transfer a data signal to the first pixel group PG1, and one end of the first horizontal line HD1 may be arranged in the area of (e.g., arranged around, or adjacent to) the blue-based pixel of the first pixel group PG1. When viewed from a direction perpendicular to the substrate 200, one end of the first horizontal line HD1 may overlap a blue-based pixel, and in this case, the one end of the first horizontal line HD1 may be regarded as being arranged in the area of the blue-based pixel. In plan view, the first horizontal line HD1 may be arranged between a second horizontal line HD2 and a third horizontal line HD3, which will be described below.

The second data line DL2 may include the second horizontal line HD2 extending in the second direction, and may transfer a data signal to the second pixel group PG2, and one end of the second horizontal line HD2 may be arranged in the area of the green-based pixel of the second pixel group PG2. When viewed from a direction perpendicular to the substrate 200, one end of the second horizontal line HD2 may overlap a green-based pixel, and in this case, the one end of the second horizontal line HD2 may be regarded as being arranged in the area of the green-based pixel.

The third data line DL3 may include the third horizontal line HD3 extending in the second direction, and may transfer a data signal to the third pixel group PG3, and one end of the third horizontal line HD3 may be arranged in the area of the blue-based pixel of the third pixel group PG3. When viewed from a direction perpendicular to the substrate 200, one end of the third horizontal line HD3 may overlap the blue-based pixel, and in this case, the one end of the third horizontal line HD3 may be regarded as being arranged in the area of the blue-based pixel.

The fourth data line DL4 may include a fourth horizontal line HD4 extending in the second direction, and may transfer a data signal to the fourth pixel group PG4, and one end of the fourth horizontal line HD4 may be arranged in the area of the green-based pixel of the fourth pixel group PG4. When viewed from a direction perpendicular to the substrate 200, one end of the fourth horizontal line HD4 may overlap a green-based pixel, and in this case, the one end of the fourth horizontal line HD4 may be regarded as being arranged in the area of the green-based pixel.

The fifth data line DL5 may include a fifth horizontal line HD5 extending in the second direction, and may transfer a data signal to the fifth pixel group PG5, and one end of the fifth horizontal line HD5 may be arranged in the area of the blue-based pixel of the fifth pixel group PG5. When viewed from a direction perpendicular to the substrate 200, one end of the fifth horizontal line HD5 may overlap a blue-based pixel, and in this case, the one end of the fifth horizontal line HD5 may be regarded as being arranged in the area of the blue-based pixel.

The sixth data line DL6 may include a sixth horizontal line HD6 extending in the second direction, and may transfer a data signal to the sixth pixel group PG6, and one end of the sixth horizontal line HD6 may be arranged in the area of the green-based pixel of the sixth pixel group PG6. When viewed from a direction perpendicular to the substrate 200, one end of the sixth horizontal line HD6 may overlap a green-based pixel, and in this case, the one end of the sixth horizontal line HD6 may be regarded as being arranged in the area of the green-based pixel.

The seventh data line DL7 may include a seventh horizontal line HD7 extending in the second direction, and may transfer a data signal to the seventh pixel group PG7, and one end of the seventh horizontal line HD7 may be arranged in the area of the blue-based pixel of the seventh pixel group PG7. When viewed from a direction perpendicular to the substrate 200, one end of the seventh horizontal line HD7 may overlap a blue-based pixel, and in this case, the one end of the seventh horizontal line HD7 may be regarded as being arranged in the area of the blue-based pixel.

The eighth data line DL8 may include an eighth horizontal line HD8 extending in the second direction, and may transfer a data signal to the eighth pixel group PG8, and one end of the eighth horizontal line HD8 may be arranged in the area of the green-based pixel of the eighth pixel group PG8. When viewed from a direction perpendicular to the substrate 200, one end of the eighth horizontal line HD8 may overlap a green-based pixel, and in this case, the one end of the eighth horizontal line HD8 may be regarded as being arranged in the area of the green-based pixel.

In addition, the display apparatus 10 may further include an n-th data line, the n-th data line may include an n-th horizontal line extending in the second direction, and may transfer a data signal to an n-th pixel group, and one end of the n-th horizontal line may be arranged in the area of a blue-based pixel or green-based pixel of the n-th pixel group.

One end of a horizontal line of the display apparatus 10 according to one or more embodiments may be arranged in the area of a blue-based pixel or a green-based pixel.

As shown in FIG. 8, the display apparatus 10 according to one or more embodiments may include the data driver 150 for generating or outputting a data signal, and may include the gate driver 130 (refer to FIG. 2) for generating or outputting a gate signal.

A data signal generated or output by the data driver 150 may include a first data signal DATA1 (refer to FIG. 6) and the second data signal DATA2. For example, the first data signal DATA1 may be a data set about red-based pixels and blue-based pixels. The second data signal DATA2 may be a data set about green-based pixels. As shown in FIG. 8, the display apparatus 10 according to one or more embodiments may further include the group of connection nodes 160 having a plurality of nodes for electrically connecting the plurality of data lines DL and the data distributor 170 to each other.

The group of connection nodes 160 may be arranged between the plurality of data lines DL and the data distributor 170. One node of the group of connection nodes 160 may be connected to one data line and to one switch of the data distributor 170. The group of connection nodes 160 may be arranged between the plurality of pixels PX and the data distributor 170 in the first area AR1. The group of connection nodes 160 may be arranged in the second peripheral area PA-2 of the peripheral area PA.

As shown in FIGS. 7 and 8, in plan view, a length of the first horizontal line HD1 may be longer than a length of the second horizontal line HD2. In plan view, the length of the second horizontal line HD2 may be longer than a length of the third horizontal line HD3. In plan view, the length of the third horizontal line HD3 may be longer than a length of the fourth horizontal line HD4. In plan view, the length of the fourth horizontal line HD4 may be longer than a length of the fifth horizontal line HD5. In plan view, the length of the fifth horizontal line HD5 may be longer than a length of the sixth horizontal line HD6. In plan view, the length of the sixth horizontal line HD6 may be longer than a length of the seventh horizontal line HD7. In plan view, the length of the seventh horizontal line HD7 may be longer than a length of the eighth horizontal line HD8.

The display apparatus 10 according to one or more embodiments may further include the plurality of gate lines GL for respectively transferring scan signals to the plurality of pixels PX, and extending substantially in the second direction. The plurality of gate lines GL may include at least a first gate line GL1 to an eighth gate line GL8. In one or more embodiments, the plurality of gate lines GL may further include an n-th gate line. The plurality of gate lines GL may transfer gate signals generated or output by the gate driver 130 to the plurality of pixels PX, or to thin-film transistors respectively electrically connected to the plurality of pixels PX. Herein, the plurality of gate lines GL and the plurality of data lines DL may include a matrix structure for implementing the screen of the display apparatus 10.

As shown in FIGS. 7 and 8, the first gate line GL1 may be arranged in parallel to the second horizontal line HD2 and may be arranged in the area of the second horizontal line HD2. The first gate line GL1 may be arranged closest to the second horizontal line HD2 among all horizontal lines. However, a scan signal transferred through the first gate line GL1 may not affect, or may hardly affect, a data signal transferred through the second horizontal line HD2.

As shown in FIG. 6, the second horizontal line HD2 transfers the second data signal DATA2 of FIG. 6 to the second pixel group PG2. Accordingly, the brightness of the green-based pixel of the second pixel group PG2 is not changed by the scan signal of the first gate line GL.

The second gate line GL2 may be arranged in parallel to the first horizontal line HD1, and may be arranged in the area of the first horizontal line HD1. The second gate line GL2 may be arranged closest to the first horizontal line HD1 among all horizontal lines. Accordingly, a scan signal transferred through the second gate line GL2 may affect a data signal transferred through the first horizontal line HD1.

As shown in FIG. 6, the first horizontal line HD1 transfers the first data signal DATA1 to the first pixel group PG1. As one end of the first horizontal line HD1 is arranged in the area of the blue-based pixel of the first pixel group PG1, the brightness of the blue-based pixel of the first pixel group PG1 may be changed by the scan signal of the second gate line GL2, but such a change in brightness is not well recognized by human eyes.

The third gate line GL3 may be arranged in parallel to the third horizontal line HD3, and may be arranged in the area of the third horizontal line HD3. The third gate line GL3 may be arranged closest to the third horizontal line HD3 among all horizontal lines. Accordingly, a scan signal transferred through the third gate line GL3 may affect a data signal transferred through the third horizontal line HD3.

As shown in FIG. 6, the third horizontal line HD3 transfers the first data signal DATA1 to the third pixel group PG3. As one end of the third horizontal line HD3 is arranged in the area of the blue-based pixel of the third pixel group PG3, the brightness of the blue-based pixel of the third pixel group PG3 may be changed by the scan signal of the third gate line GL3, but such a change in brightness is not well recognized by human eyes.

The fourth gate line GL4 may be arranged in parallel to the fourth horizontal line HD4, and may be arranged in the area of the fourth horizontal line HD4. The fourth gate line GL4 may be arranged closest to the fourth horizontal line HD4 among all horizontal lines. However, a scan signal transferred through the fourth gate line GL4 may not affect, or may hardly affect, a data signal transferred through the fourth horizontal line HD4.

As shown in FIG. 6, the fourth horizontal line HD4 transfers the second data signal DATA2 of FIG. 6 to the fourth pixel group PG4. Accordingly, the brightness of the green-based pixel of the fourth pixel group PG4 is not changed by the scan signal of the fourth gate line GL4.

The fifth gate line GL5 may be arranged in parallel to the sixth horizontal line HD6, and may be arranged in the area of the sixth horizontal line HD6. The fifth gate line GL5 may be arranged closest to the sixth horizontal line HD6 among all horizontal lines. However, a scan signal transferred through the fifth gate line GL5 may not affect, or may hardly affect, a data signal transferred through the sixth horizontal line HD6.

As shown in FIG. 6, the sixth horizontal line HD6 transfers the second data signal DATA2 of FIG. 6 to the sixth pixel group PG6. Accordingly, the brightness of the green-based pixel of the sixth pixel group PG6 is not changed by the scan signal of the fifth gate line GL5.

The sixth gate line GL6 may be arranged in parallel to the fifth horizontal line HD5, and may be arranged in the area of the fifth horizontal line HD5. The sixth gate line GL6 may be arranged closest to the fifth horizontal line HD5 among all horizontal lines. Accordingly, a scan signal transferred through the sixth gate line GL6 may affect a data signal transferred through the fifth horizontal line HD5.

As shown in FIG. 6, the fifth horizontal line HD5 transfers the first data signal DATA1 to the fifth pixel group PG5. As one end of the fifth horizontal line HD5 is arranged in the area of the blue-based pixel of the fifth pixel group PG5, the brightness of the blue-based pixel of the fifth pixel group PG5 may be changed by the scan signal of the sixth gate line GL6, but such a change in brightness is not well recognized by human eyes.

The seventh gate line GL7 may be arranged in parallel to the seventh horizontal line HD7, and may be arranged in the area of the seventh horizontal line HD7. The seventh gate line GL7 may be arranged closest to the seventh horizontal line HD7 among all horizontal lines. Accordingly, a scan signal transferred through the seventh gate line GL7 may affect a data signal transferred through the seventh horizontal line HD7.

As shown in FIG. 6, the seventh horizontal line HD7 transfers the first data signal DATA1 to the seventh pixel group PG7. As one end of the seventh horizontal line HD7 is arranged in the area of the blue-based pixel of the seventh pixel group PG7, the brightness of the blue-based pixel of the seventh pixel group PG7 may be changed by the scan signal of the seventh gate line GL7, but such a change in brightness is not well recognized by human eyes.

The eighth gate line GL8 may be arranged in parallel to the eighth horizontal line HD8, and may be arranged in the area of the eighth horizontal line HD8. The eighth gate line GL8 may be arranged closest to the eighth horizontal line HD8 among all horizontal lines. However, a scan signal transferred through the eighth gate line GL8 may not affect, or may hardly affect, a data signal transferred through the eighth horizontal line HD8.

As shown in FIG. 6, the eighth horizontal line HD8 transfers the second data signal DATA2 of FIG. 6 to the eighth pixel group PG8. Accordingly, the brightness of the green-based pixel of the eighth pixel group PG8 is not changed by the scan signal of the eighth gate line GL8.

As shown in FIGS. 7 and 8, the second gate line GL2 may be the third gate line arranged based on the fourth gate line GL4 among the plurality of gate lines GL, and may be the seventh gate line arranged based on the eighth gate line GL8.

For example, in plan view, when a gate line arranged closest to the second peripheral area PA-2 is defined as the first gate line, the second gate line GL2 may be the gate line arranged in the 4n−1-th order (where n is a natural number).

In plan view, a horizontal line arranged in the area of the gate line arranged in the 4n−1-th order may be the first horizontal line HD1 of the first data line DL1, which transfers a data signal to the first pixel group PG1. Accordingly, the first horizontal line HD1 may also be seen to be arranged in the 4n−1-th order. For example, in plan view, when a horizontal line arranged closest to the second peripheral area PA-2 is defined as the first horizontal line, or when a gate line arranged closest to the horizontal line that is arranged closest to the second peripheral area PA-2 is defined as the first gate line, the second gate line GL2 may be the gate line arranged in the 4n−1-th order, and the first horizontal line HD1 may be the horizontal line arranged in the 4n−1-th order (where n is a natural number).

In other words, one end of the horizontal line arranged in the 4n−1-th order may be arranged in the area of a blue-based pixel in the second area AR2, and another end thereof may be arranged in the first area AR1.

One end of the horizontal line arranged in the 4n−2-th order may be arranged in the area of a blue-based pixel in the second area AR2, and another end thereof may be arranged in the first area AR1. As shown in FIGS. 7 and 8, the first gate line GL1 may be the fourth gate line arranged based on the fourth gate line GL4 among the plurality of gate lines GL, and may be the eighth gate line arranged based on the eighth gate line GL8.

For example, in plan view, when a gate line arranged closest to the second peripheral area PA-2 is defined as the first gate line, the first gate line GL1 may be a gate line arranged in the 4n-th order (where n is a natural number).

In plan view, a horizontal line arranged in the area of the gate line arranged in the 4n-th order may be the second horizontal line HD2 of the second data line DL2, which transfers a data signal to the second pixel group PG2. Accordingly, the second horizontal line HD2 may also be seen to be arranged in the 4n-th order. For example, in plan view, when a horizontal line arranged closest to the second peripheral area PA-2 is defined as the first horizontal line, or when a gate line arranged closest to a horizontal line that is arranged closest to the second peripheral area PA-2 is defined as the first gate line, the first gate line GL1 may be a gate line arranged in the 4n-th order, and the first horizontal line HD1 may be a horizontal line arranged in the 4n-th order.

In order words, an end of the horizontal line arranged in the 4n-th order may be arranged in the area of a green-based pixel in the second area AR2, and another end thereof may be arranged in the first area AR1.

One end of a horizontal line arranged in the 4n−3-th order may be arranged in the area of a green-based pixel in the second area AR2, and another end thereof may be arranged in the first area AR1. As shown in FIGS. 7 and 8, the second gate line GL2 may be the seventh gate line arranged based on the eighth gate line GL8 among the plurality of gate lines GL.

For example, in plan view, when a gate line arranged closest to the second peripheral area PA-2 is defined as the first gate line, the second gate line GL2 may be a gate line arranged in the 8n−1-th order (where n is a natural number).

For example, in plan view, a horizontal line arranged in the area of the gate line arranged in the 8n−1-th order may be the first horizontal line HD1 of the first data line DL1, which transfers a data signal to the first pixel group PG1.

Accordingly, the first horizontal line HD1 may also be seen to be arranged in the 8n−1-th order. In other words, an end of the horizontal line arranged in the 8n−1-th order may be arranged in the area of a blue-based pixel in the second area AR2, and another end thereof may be arranged in the first area AR1.

An end of a horizontal line arranged in the 8n−2-th order may be arranged in the area of a blue-based pixel in the second area AR2, and another end thereof may be arranged in the first area AR1. For example, in plan view, a horizontal line arranged in the area of a gate line arranged in the 8n−5-th order may be the fifth horizontal line HD5 of the fifth data line DL5, which transfers a data signal to the fifth pixel group PG5.

Accordingly, the fifth horizontal line HD5 may also be seen to be arranged in the 8n−5-th order. In order words, an end of the horizontal line arranged in the 8n−5-th order may be arranged in the area of a blue-based pixel in the second area AR2, and another end thereof may be arranged in the first area AR1.

An end of a horizontal line arranged in the 8n−6-th order may be arranged in the area of a blue-based pixel in the second area AR2, and another end thereof may be arranged in the first area AR1. As shown in FIGS. 7 and 8, the first gate line GL1 may be the eighth gate line arranged based on the eighth gate line GL8 among the plurality of gate lines GL.

For example, in plan view, when a gate line arranged closest to the second peripheral area PA-2 is defined as the first gate line, the first gate line GL1 may be a gate line arranged in the 8n-th order (where n is a natural number).

In plan view, a horizontal line arranged in the area of the gate line arranged in the 8n-th order may be the second horizontal line HD2 of the second data line DL2, which transfers a data signal to the second pixel group PG2. Accordingly, the second horizontal line HD2 may also be seen to be arranged in the 8n-th order. In other words, an end of the horizontal arranged in the 8n-th order may be arranged in the area of a green-based pixel in the second area AR2, and another end thereof may be arranged in the first area AR1.

One end of a horizontal line arranged in the 8n−3-th order may be arranged in the area of a green-based pixel in the second area AR2, and another end thereof may be arranged in the first area AR1. One end of a horizontal line arranged in the 8n−4-th order may be arranged in the area of a green-based pixel in the second area AR2, and another end thereof may be arranged in the first area AR1. One end of a horizontal line arranged in the 8n−7-th order may be arranged in the area of a green-based pixel in the second area AR2, and another end thereof may be arranged in the first area AR1. As shown in FIG. 7, the first data line DL1 may include a first vertical line PD1 extending in the first direction or y-axis direction in plan view.

The first vertical line PD1 may be arranged in the area of the first pixel group PG1, and may be electrically connected to the first horizontal line HD1 through a first contact (e.g., contact unit) CT1. The first contact CT1 is a component electrically connecting the first vertical line PD1 and the first horizontal line HD1 to each other, and may be a bridge, a contact hole, or the like. The first contact CT1 may be electrically connected to one end of the first horizontal line HD1, and may be arranged in the second area AR2. The first contact CT1 may be arranged in the area of the blue-based pixel of the first pixel group PG1.

The second data line DL2 may include a second vertical line PD2 extending in the first direction or y-axis direction in plan view. The second vertical line PD2 may be arranged in the area of the second pixel group PG2, and may be electrically connected to the second horizontal line HD2 through a second contact CT2. The second contact CT2 is a component electrically connecting the second vertical line PD2 and the second horizontal line HD2 to each other, and may be a bridge, a contact hole, or the like. The second contact CT2 may be electrically connected to one end of the second horizontal line HD2, and may be arranged in the second area AR2. The second contact CT2 may be arranged in the area of the green-based pixel of the second pixel group PG2.

The third data line DL3 may include a third vertical line PD3 extending in the first direction or y-axis direction in plan view. The third vertical line PD3 may be arranged in the area of the third pixel group PG3, and may be electrically connected to the third horizontal line HD3 through a third contact CT3. The third contact CT3 is a component electrically connecting the third vertical line PD3 and the third horizontal line HD3 to each other, and may be a bridge, a contact hole, or the like. The third contact CT3 may be electrically connected to one end of the third horizontal line HD3, and may be arranged in the second area AR2. The third contact CT3 may be arranged in the area of the blue-based pixel of the third pixel group PG3.

The fourth data line DL4 may include a fourth vertical line PD4 extending in the first direction or y-axis direction in plan view. The fourth vertical line PD4 may be arranged in the area of the fourth pixel group PG4, and may be electrically connected to the fourth horizontal line HD4 through a fourth contact CT4. The fourth contact CT4 is a component electrically connecting the fourth vertical line PD4 and the fourth horizontal line HD4 to each other, and may be a bridge, a contact hole, or the like. The fourth contact CT4 may be electrically connected to one end of the fourth horizontal line HD4, and may be arranged in the second area AR2. The fourth contact CT4 may be arranged in the area of the green-based pixel of the fourth pixel group PG4.

The fifth data line DL5 may include a fifth vertical line PD5 extending in the first direction or y-axis direction in plan view. The fifth vertical line PD5 may be arranged in the area of the fifth pixel group PG5, and may be electrically connected to the fifth horizontal line HD5 through a fifth contact CT5. The fifth contact CT5 is a component electrically connecting the fifth vertical line PD5 and the fifth horizontal line HD5 to each other, and may be a bridge, a contact hole, or the like. The fifth contact CT5 may be electrically connected to one end of the fifth horizontal line HD5, and may be arranged in the second area AR2. The fifth contact CT5 may be arranged in the area of the blue-based pixel of the fifth pixel group PG5.

The sixth data line DL6 may include a sixth vertical line PD6 extending in the first direction or y-axis direction in plan view. The sixth vertical line PD6 may be arranged in the area of the sixth pixel group PG6, and may be electrically connected to the sixth horizontal line HD6 through a sixth contact CT6. The sixth contact CT6 is a component electrically connecting the sixth vertical line PD6 and the sixth horizontal line HD6 to each other, and may be a bridge, a contact hole, or the like. The sixth contact CT6 may be electrically connected to one end of the sixth horizontal line HD6, and may be arranged in the second area AR2. The sixth contact CT6 may be arranged in the area of the green-based pixel of the sixth pixel group PG6.

The seventh data line DL7 may include a seventh vertical line PD7 extending in the first direction or y-axis direction in plan view. The seventh vertical line PD7 may be arranged in the area of the seventh pixel group PG7, and may be electrically connected to the seventh horizontal line HD7 through a seventh contact CT7. The seventh contact CT7 is a component electrically connecting the seventh vertical line PD7 and the seventh horizontal line HD7 to each other, and may be a bridge, a contact hole, or the like. The seventh contact CT7 may be electrically connected to one end of the seventh horizontal line HD7, and may be arranged in the second area AR2. The seventh contact CT7 may be arranged in the area of the blue-based pixel of the seventh pixel group PG7.

The eighth data line DL8 may include an eighth vertical line PD8 extending in the first direction or y-axis direction in plan view. The eighth vertical line PD8 may be arranged in the area of the eighth pixel group PG8, and may be electrically connected to the eighth horizontal line HD8 through an eighth contact CT8. The eighth contact CT8 is a component electrically connecting the eighth vertical line PD8 and the eighth horizontal line HD8 to each other, and may be a bridge, a contact hole, or the like. The eighth contact CT8 may be electrically connected to one end of the eighth horizontal line HD8, and may be arranged in the second area AR2. The eighth contact CT8 may be arranged in the area of the green-based pixel of the eighth pixel group PG8.

In addition, an n-th data line may include an n-th vertical line extending in the first direction or y-axis direction in plan view. The n-th vertical line may be arranged in the area of an n-th pixel group, and may be electrically connected to an n-th horizontal line through an n-th contact. The n-th contact is a component electrically connecting the n-th vertical line and the n-th horizontal line to each other, and may be a bridge, a contact hole, or the like. The n-th contact may be electrically connected to one end of the n-th horizontal line, and may be arranged in the second area AR2. The n-th contact may be arranged in the area of a blue-based pixel or green-based pixel of the n-th pixel group.

As shown in FIG. 8, the first data line DL may include a first sub line VD1 extending in the first direction in the first area AR1. The first sub line VD1 may electrically connect another end of the first horizontal line HD1 and the group of connection nodes 160 or one node of the group of connection nodes 160 to each other. The first sub line VD1 may be electrically connected to the data distributor 170 or a first-1 switch SW1-1 of the data distributor 170 through the electrically connected node. In plan view, a length of the first sub line VD1 may be less than a length of a second sub line VD2.

The first-1 switch SW1-1 may receive the first control signal CLA through the first control line CL1. The first-1 switch SW1-1 may be turned on/off by the first control signal CLA. When the first-1 switch SW1-1 is turned on, a data signal generated or output by the data driver 150 may be transferred to the first data line DL1 through the first-1 switch SW1-1 and the node.

The second data line DL2 may include the second sub line VD2 extending in the first direction in the first area AR1. The second sub line VD2 may electrically connect another end of the second horizontal line HD2 and the group of connection nodes 160 or one node of the group of connection nodes 160 to each other. The second sub line VD2 may be electrically connected to the data distributor 170 or a second-1 switch SW2-1 of the data distributor 170 through the electrically connected node. In plan view, the length of the second sub line VD2 may be greater than the length of the first sub line VD1 and a length of each of a third sub line VD3 to an eighth sub line VD8.

The second-1 switch SW2-1 may receive the second control signal CLB through the second control line CL2. The second-1 switch SW2-1 may be turned on/off by the second control signal CLB. When the second-1 switch SW2-1 is turned on, a data signal generated or output by the data driver 150 may be transferred to the second data line DL2 through the second-1 switch SW2-1 and the node.

The third data line DL3 may include the third sub line VD3 extending in the first direction in the first area AR1. The third sub line VD3 may electrically connect another end of the third horizontal line HD3 and the group of connection nodes 160 or one node of the group of connection nodes 160 to each other. The third sub line VD3 may be electrically connected to the data distributor 170 or a third-1 switch SW3-1 of the data distributor 170 through the electrically connected node. In plan view, the length of the third sub line VD3 may be less than the length of the first sub line VD1. Also, the length of the third sub line VD3 may be greater than a length of each of a fourth sub line VD4 to the eighth sub line VD8.

The third-1 switch SW3-1 may receive the first control signal CLA through the first control line CL1. The third-1 switch SW3-1 may be turned on/off by the first control signal CLA. When the third-1 switch SW3-1 is turned on, a data signal generated or output by the data driver 150 may be transferred to the third data line DL3 through the third-1 switch SW3-1 and the node.

The fourth data line DL4 may include a fourth sub line VD4 extending in the first direction in the first area AR1. The fourth sub line VD4 may electrically connect another end of the fourth horizontal line HD4 and the group of connection nodes 160 or one node of the group of connection nodes 160 to each other. The fourth sub line VD4 may be electrically connected to the data distributor 170 or a fourth-1 switch SW4-1 of the data distributor 170 through the electrically connected node. In plan view, a length of the fourth sub line VD4 may be greater than a length of each of a fifth sub line VD5 to the eighth sub line VD8.

The fourth-1 switch SW4-1 may receive the second control signal CLB through the second control line CL2. The fourth-1 switch SW4-1 may be turned on/off by the second control signal CLB. When the fourth-1 switch SW4-1 is turned on, a data signal generated or output by the data driver 150 may be transferred to the fourth data line DL4 through the fourth-1 switch SW4-1 and the node.

The fifth data line DL5 may include the fifth sub line VD5 extending in the first direction in the first area AR1. The fifth sub line VD5 may electrically connect another end of the fifth horizontal line HD5 and the group of connection nodes 160 or one node of the group of connection nodes 160 to each other. The fifth sub line VD5 may be electrically connected to the data distributor 170 or a fifth-1 switch SW5-1 of the data distributor 170 through the electrically connected node. In plan view, the length of the fifth sub line VD5 may be less than the length of a sixth sub line VD6. Also, the length of the fifth sub line VD5 may be greater than the length of each of the seventh sub line VD7 and the eighth sub line VD8.

The fifth-1 switch SW5-1 may receive the first control signal CLA through the first control line CL1. The fifth-1 switch SW5-1 may be turned on/off by the first control signal CLA. When the fifth-1 switch SW5-1 is turned on, a data signal generated or output by the data driver 150 may be transferred to the fifth data line DL5 through the fifth-1 switch SW5-1 and the node.

The sixth data line DL6 may include the sixth sub line VD6 extending in the first direction in the first area AR1. The sixth sub line VD6 may electrically connect another end of the sixth horizontal line HD6 and the group of connection nodes 160 or one node of the group of connection nodes 160 to each other. The sixth sub line VD6 may be electrically connected to the data distributor 170 or a sixth-1 switch SW6-1 of the data distributor 170 through the electrically connected node. In plan view, the length of the sixth sub line VD6 may be greater than the length of each of the fifth sub line VD5, the seventh sub line VD7, and the eighth sub line VD8.

The sixth-1 switch SW6-1 may receive the second control signal CLB through the second control line CL2. The sixth-1 switch SW6-1 may be turned on/off by the second control signal CLB. When the sixth-1 switch SW6-1 is turned on, a data signal generated or output by the data driver 150 may be transferred to the sixth data line DL6 through the sixth-1 switch SW6-1 and the node.

The seventh data line DL7 may include the seventh sub line VD7 extending in the first direction in the first area AR1. The seventh sub line VD7 may electrically connect another end of the seventh horizontal line HD7 and the group of connection nodes 160 or one node of the group of connection nodes 160 to each other. The seventh sub line VD7 may be electrically connected to the data distributor 170 or a seventh-1 switch SW7-1 of the data distributor 170 through the electrically connected node. In plan view, the length of the seventh sub line VD7 may be greater than the length of the eighth sub line VD8.

The seventh-1 switch SW7-1 may receive the first control signal CLA through the first control line CL1. The seventh-1 switch SW7-1 may be turned on/off by the first control signal CLA. When seventh-1 switch SW7-1 is turned on, a data signal generated or output by the data driver 150 may be transferred to the seventh data line DL7 through the seventh-1 switch SW7-1 and the node.

The eighth data line DL8 may include the eighth sub line VD8 extending in the first direction in the first area AR1. The eighth sub line VD8 may electrically connect another end of the eighth horizontal line HD8 and the group of connection nodes 160 or one node of the group of connection nodes 160 to each other. The eighth sub line VD8 may be electrically connected to the data distributor 170 or an eighth-1 switch SW8-1 of the data distributor 170 through the electrically connected node.

The eighth-1 switch SW8-1 may receive the second control signal CLB through the second control line CL2. The eighth-1 switch SW8-1 may be turned on/off by the second control signal CLB. When the eighth-1 switch SW8-1 is turned on, a data signal generated or output by the data driver 150 may be transferred to the eighth data line DL8 through the eighth-1 switch SW8-1 and the node.

In addition, an n-th data line may include an n-th sub line extending in the first direction in the first area AR1. The n-th sub line may electrically connect another end of the n-th horizontal line and the group of connection nodes 160 or one node of the group of connection nodes 160 to each other. The n-th sub line may be electrically connected to the data distributor 170 or an n−1-th switch of the data distributor 170 through the electrically connected node. The n−1-th switch may receive the first control signal CLA or the second control signal CLB through the first control line CL1 or the second control line CL2. The n−1-th switch may be turned on/off by the first control signal CLA or the second control signal CLB. When the n−1-th switch is turned on, a data signal generated or output by the data driver 150 may be transferred to the n-th data line through the n−1-th switch and the node.

As shown in FIG. 8, the display apparatus 10 according to one or more embodiments may further include a ninth data line DL9 to a sixteenth data line DL16, wherein the ninth data line DL9 to the sixteenth data line DL16 may each extend in the first direction or y-axis direction in plan view and have a substantially straight line shape.

Figure 9:
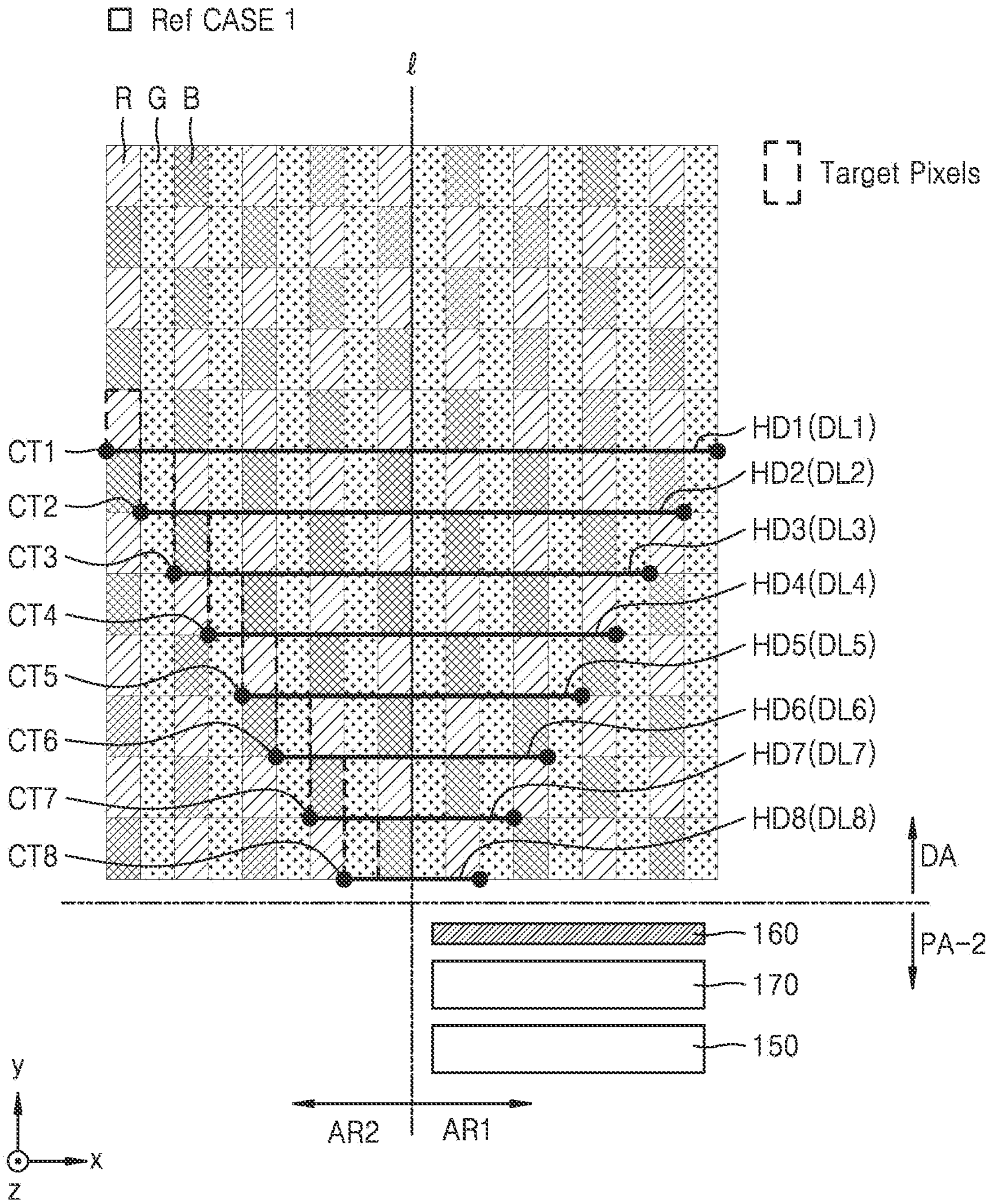
FIG. 9 is a schematic plan view mainly showing a horizontal line of a display apparatus according to a comparative example.

FIG. 9 is a schematic plan view mainly showing a horizontal line of a display apparatus according to a comparative example.

For reference, in the description of FIG. 9, descriptions already given with reference to FIGS. 1 to 8 may be omitted.

Also, for reference, components other than the horizontal line may be omitted in FIG. 9 to describe the characteristics of the horizontal line.

A display apparatus 10 according to a comparative example may include a plurality of horizontal lines in plan view.

The description of the plurality of horizontal lines already given above are omitted, and only other points are described. As shown in FIG. 9, the first horizontal line HD1 is a horizontal line arranged in the eighth order, which may be a horizontal line arranged in the 4n-th order (or the 8n-th order) based on an order close to the second peripheral area PA-2.

One end of the first horizontal line HD1 (or the first contact CT1) arranged in the second area AR2 may be arranged in the area of a red-based pixel of the first pixel group PG1. As a result, the first data signal DATA1 transferred through the first horizontal line HD1 may be interfered with by a scan signal, and the interference with the first data signal DATA1 may cause a change in brightness of a target pixel (red-based pixel) arranged in the area of the one end of the first horizontal line HD1. Because human eyes are relatively sensitive to changes in brightness of red color, the interference with the first data signal DATA1 may be recognized.

As shown in FIG. 9, the fifth horizontal line HD5 is a horizontal line arranged in the third order, which may be a horizontal line arranged in the 4n−5-th (or 8n−5-th order) based on an order close to the second peripheral area PA-2. One end of the fifth horizontal line HD5 (or the fifth contact CT5) may also cause a change in brightness of surrounding target pixels (red-based pixels), and such a change in brightness may be recognized.

Figure 10:
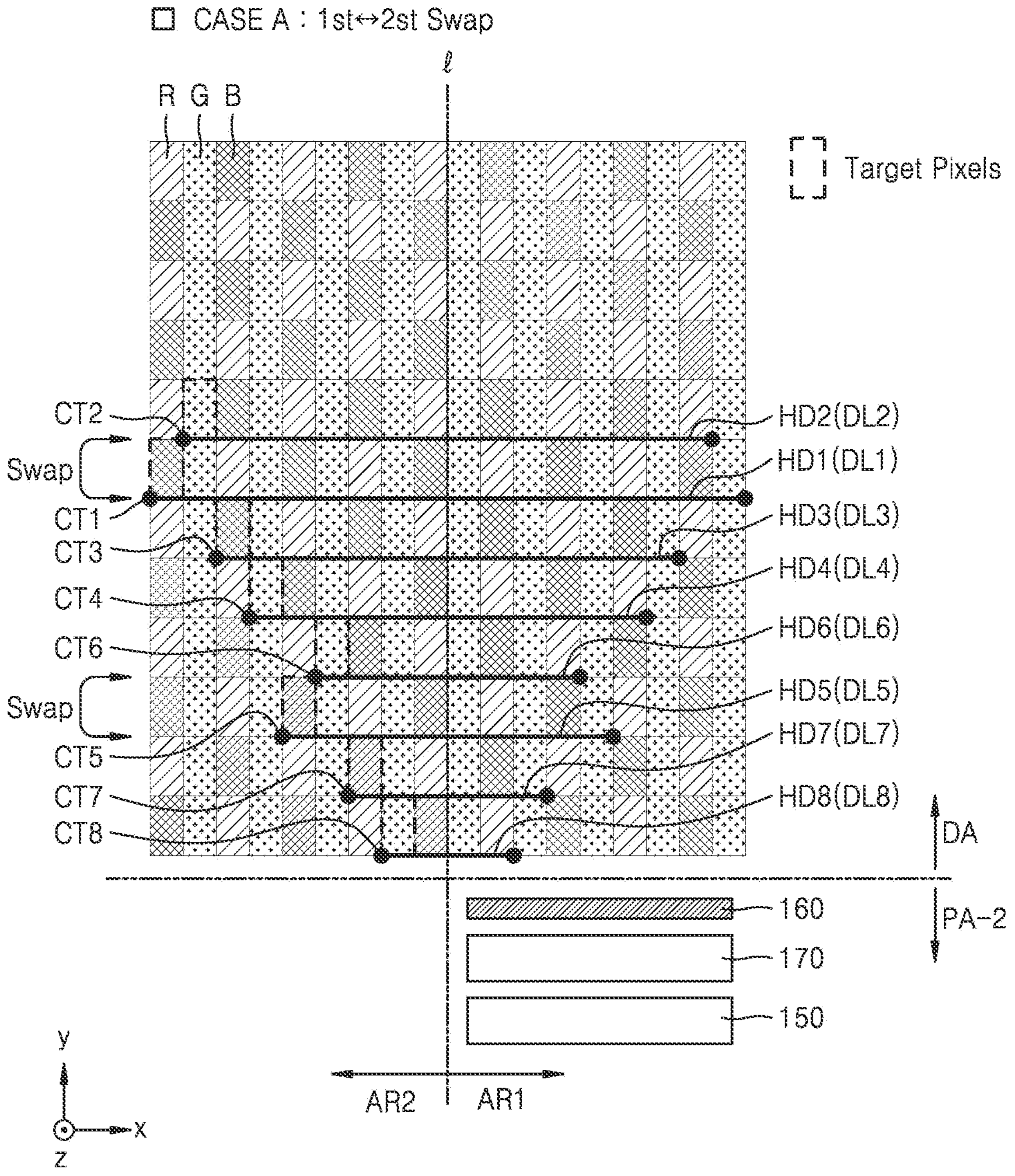
FIGS. 10 to 12 are schematic conceptual diagrams mainly showing horizontal lines of display apparatuses according to various embodiments including one or more embodiments of the disclosure.
Figure 11:
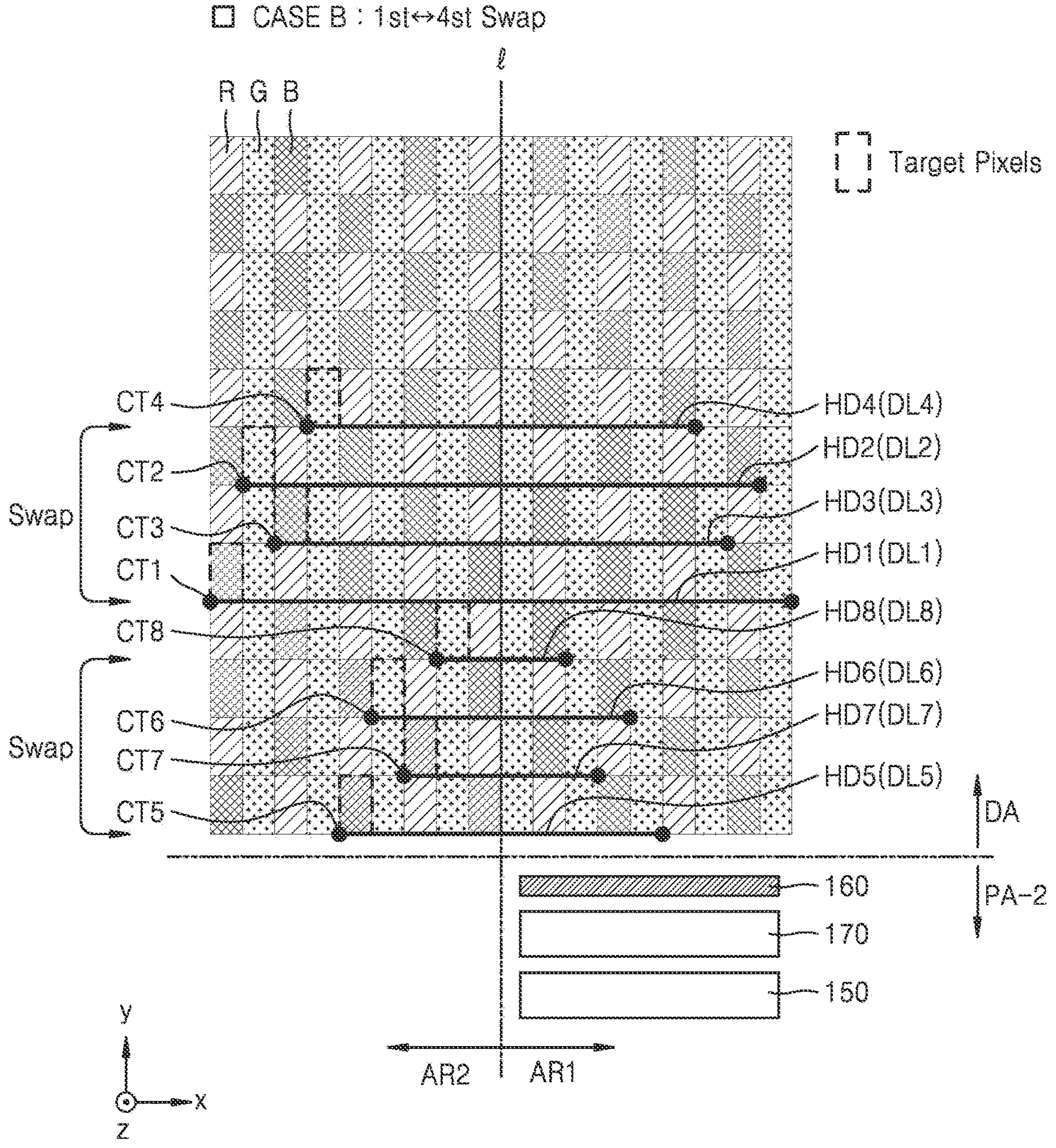
Figure 12:
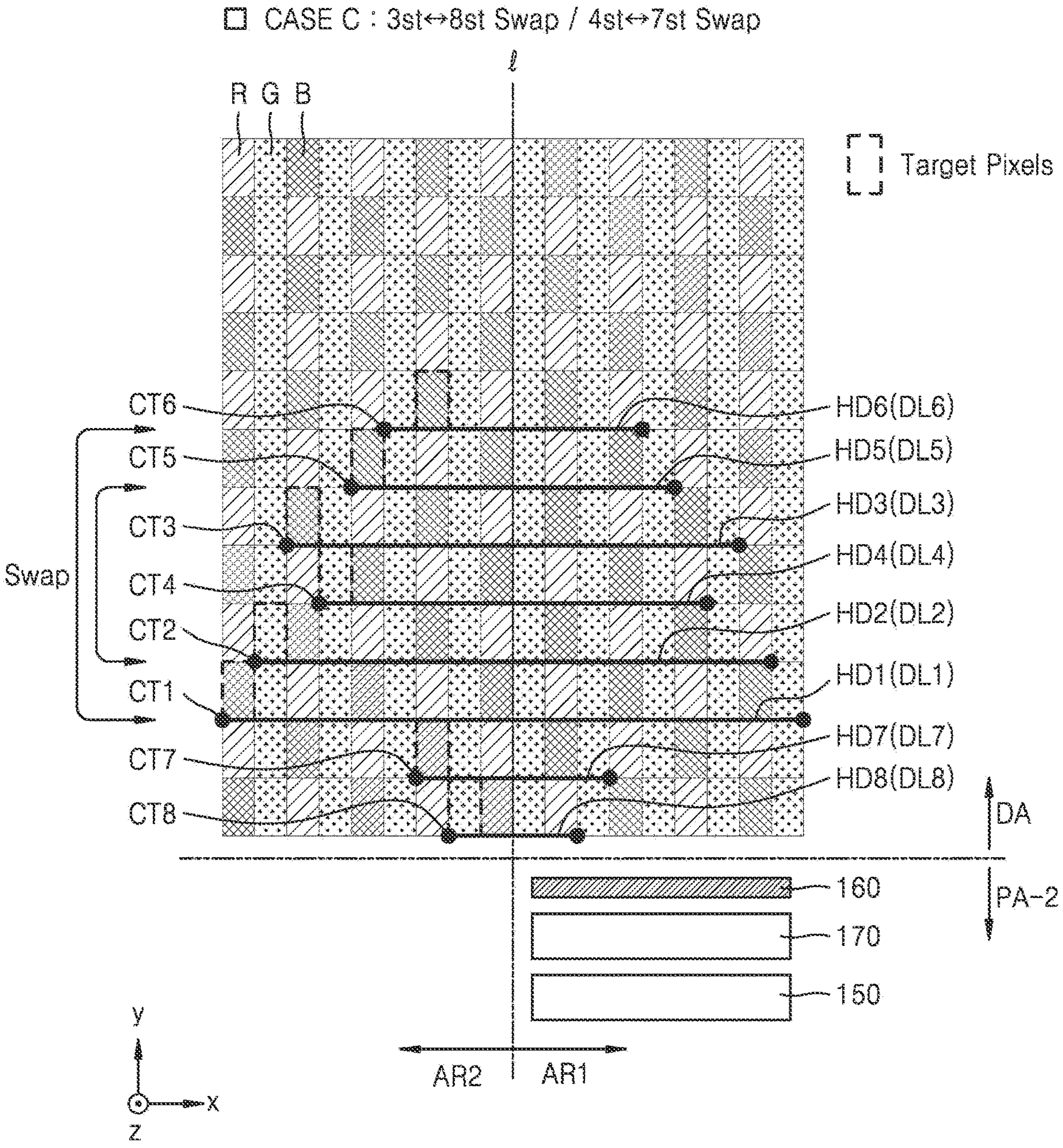

FIGS. 10 to 12 are schematic conceptual diagrams mainly showing horizontal lines of display apparatuses according to various embodiments including one or more embodiments of the disclosure.

For reference, in the description of FIGS. 10 to 12, those already given with reference to FIGS. 1 to 9 may be omitted.

Also, for reference, components other than the horizontal lines may be omitted to describe the characteristics of the horizontal lines.

As shown in FIG. 10, the display apparatus 10 according to one or more embodiments may be the same as the embodiments described in FIGS. 7 and 8.

However, when the positions of the 4n-th horizontal line and the 4n−1-th horizontal line of the display apparatus 10 according to a comparative example of FIG. 9 are changed or swapped, the display apparatus 10 according to the comparative example of FIG. 9 may be the same as the display apparatus 10 according to one or more embodiments. That is, in the display apparatus 10 according to one or more embodiments in FIGS. 7, 8, and 10, the position of one end of each of horizontal lines transferring the first data signal DATA1 or the position of a contact is changed to be arranged in the area of blue-based pixels instead of red-based pixels, the display apparatus 10 according to one or more embodiments may induce a change in brightness of blue-based pixels, which is a color that human eyes are relatively insensitive to, even when an interference occurs in the first data signal DATA1.

As shown in FIG. 11, in the display apparatus 10 according to one or more other embodiments, the positions of the 4n-th horizontal line and the 4n−3-th horizontal line are changed or swapped, the display apparatus 10 of FIG. 11 may have the same effect as the display apparatus 10 of FIG. 10.

As shown in FIG. 12, in the display apparatus 10 according to one or more other embodiments, the positions of the 8n-th horizontal line and the 8n−5-th horizontal line are changed or swapped, and the positions of the 8n−1-th horizontal line and the 8n−4-th horizontal line are changed or swapped, the display apparatus 10 of FIG. 12 may have the same effect as the display apparatus 10.

Figure 13:
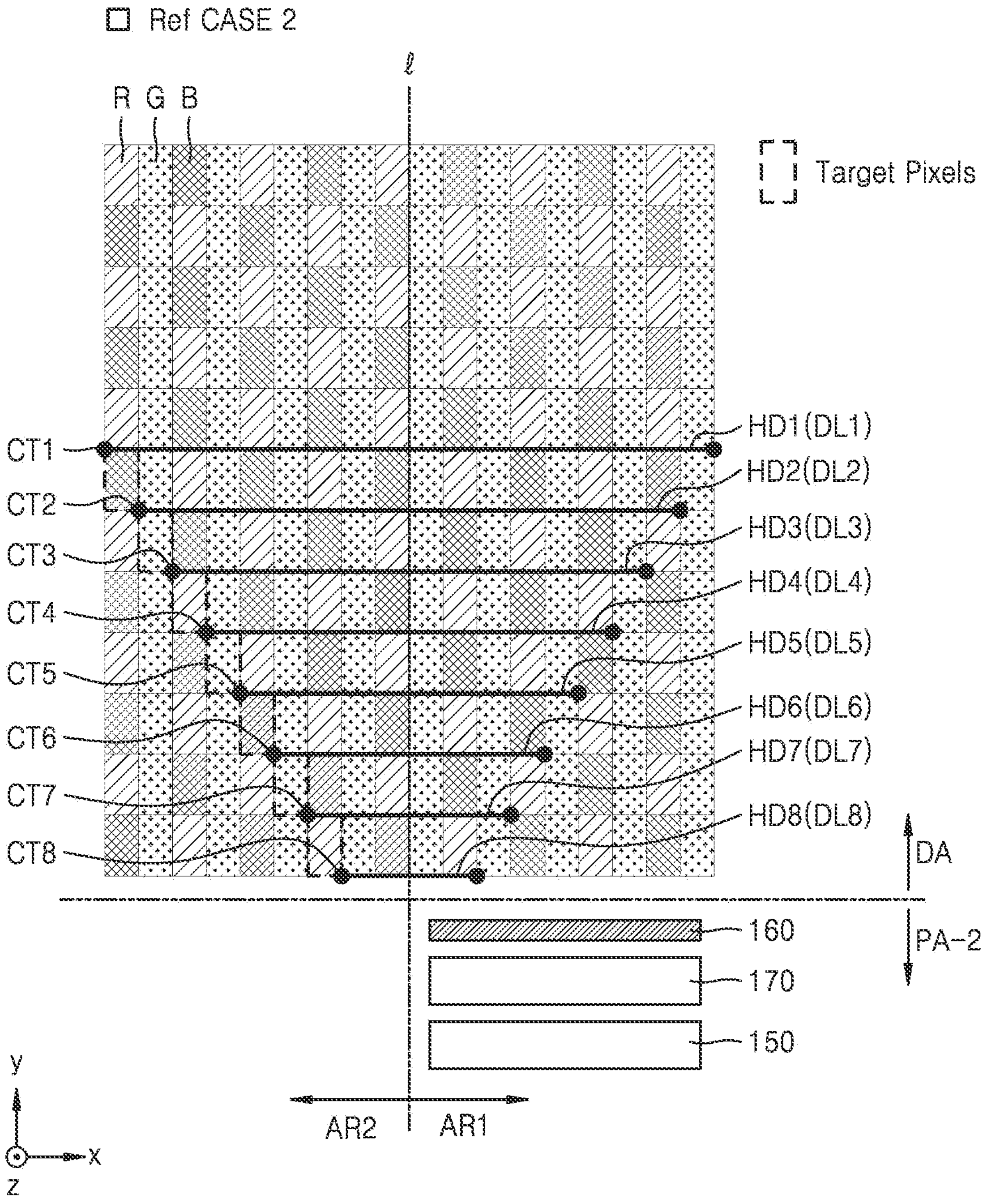
FIG. 13 is a schematic plan view mainly showing a horizontal line of a display apparatus according to a comparative example.

FIG. 13 is a schematic plan view mainly showing a horizontal line of a display apparatus according to a comparative example.

For reference, in the description of FIG. 13, descriptions already given with reference to FIGS. 1 to 2 may be omitted.

Also, for reference, components other than the horizontal line may be omitted in FIG. 13 to describe the characteristics of the horizontal line.

The contacts of the display apparatus 10 according to the embodiments shown in FIGS. 9 to 12 are located below the target pixel. Contrastingly, the contacts of the display apparatus 10 according to a comparative example of FIG. 13 are located above the target pixel. Accordingly, the order of the horizontal lines may be changed to change or swap the position of one end of the horizontal line for transferring the first data signal DATA1 or the contact to be around the blue-based pixel. In another comparative example of FIG. 13, the order of horizontal lines is not changed. As in the comparative example of FIG. 9, the interference with the first data signal DATA1 may cause a change in brightness of target pixels (red-based pixels) arranged in the area of one end of the first horizontal line HD1.

Figure 14:
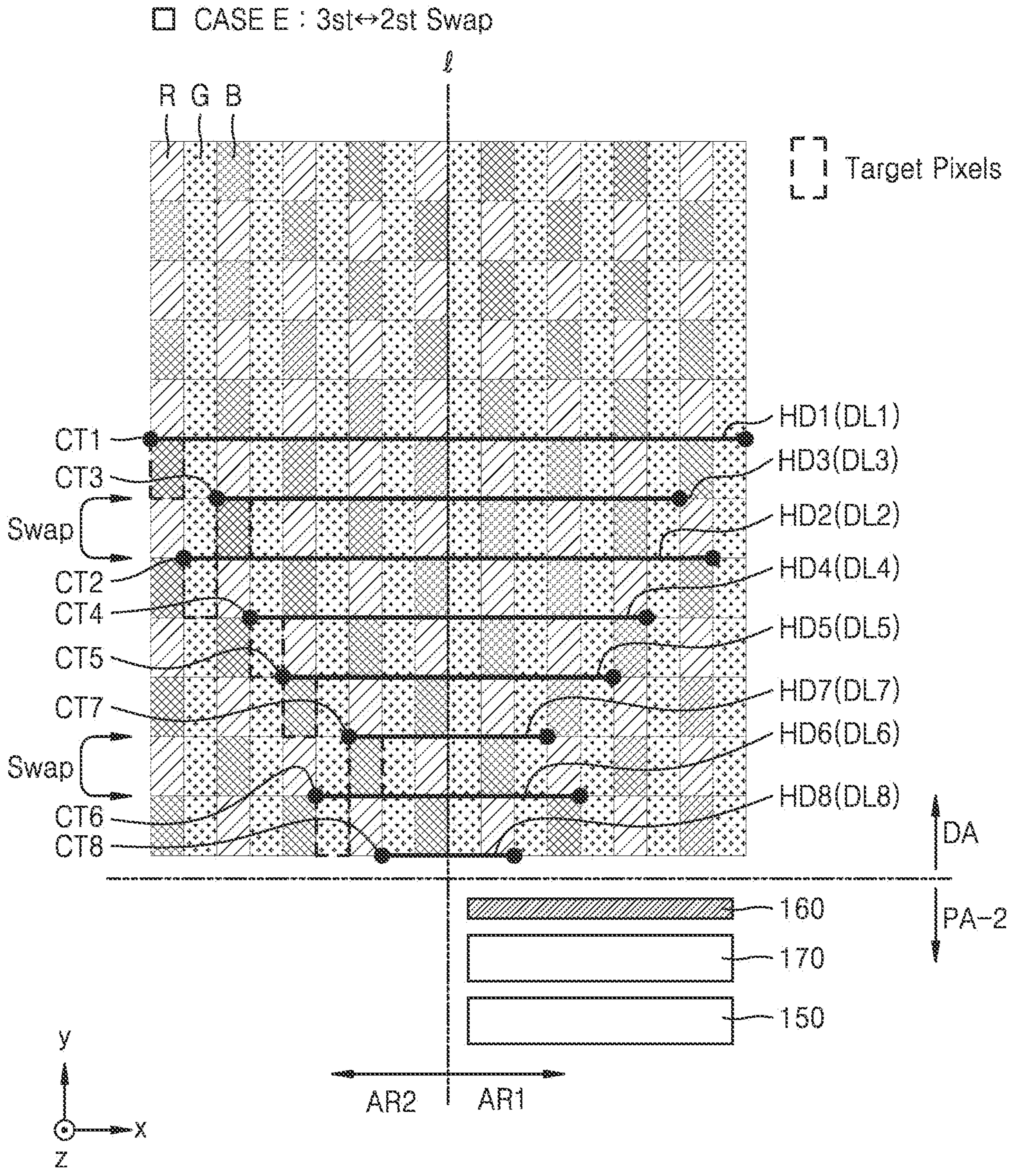
FIGS. 14 and 15 are schematic conceptual diagrams mainly showing horizontal lines of display apparatuses according to various embodiments.
Figure 15:
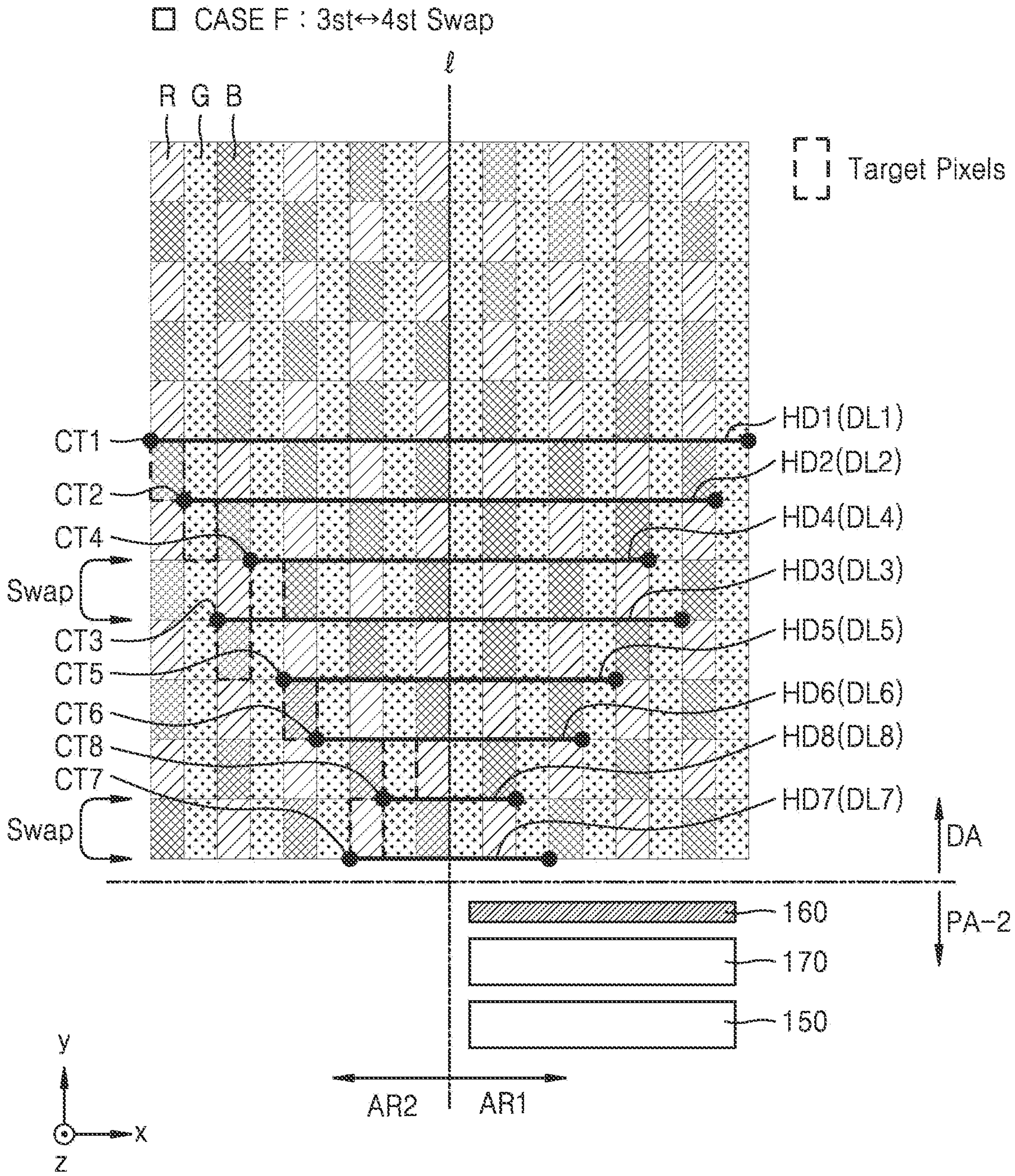

Because human eyes are relatively sensitive to changes in brightness of red color, the interference with the first data signal DATA1 may be recognized. FIGS. 14 and 15 are schematic conceptual diagrams mainly showing horizontal lines of display apparatuses according to various embodiments.

For reference, in the description of FIGS. 14 and 15, descriptions already given with reference to FIGS. 1 to 13 may be omitted.

Also, for reference, components other than the horizontal lines may be omitted to describe the characteristics of the horizontal lines.

As shown in FIG. 14, the contacts of the display apparatus 10 according to one or more other embodiments are arranged above the target pixels, like the display apparatus according to another comparative example of FIG. 13.

In the display apparatus 10 of FIG. 14, the positions of the 4n−1-th horizontal line and the 4n−2-th horizontal line are changed or swapped, and the display apparatus 10 of FIG. 14 may have the same effect as the display apparatus 10 of FIG. 10. As shown in FIG. 15, the contacts of the display apparatus 10 according to one or more other embodiments are arranged above the target pixels, like the display apparatus according to another comparative example of FIG. 13.

In the display apparatus 10 of FIG. 15, the positions of the 4n−2-th horizontal line and the 4n−3-th horizontal line are changed or swapped, and the display apparatus 10 of FIG. 15 may have the same effect as the display apparatus 10 of FIG. 10. As such, referring to FIGS. 10 to 12, 14, and 15, the display apparatus 10 according to various embodiments has the following common characteristics.

The display apparatus 10 according to various embodiments may include the substrate 200, the plurality of pixels PX, the plurality of data lines DL, and the data distributor 170.

As described above, the substrate 200 may include the first area AR1 and the second area AR2 arranged on one side of the first area AR1.

The plurality of pixels PX may mean only pixels arranged in the second area AR2.

Accordingly, the plurality of pixels PX maybe RB-pixel groups including red-based pixels and blue-based pixels, which are arranged in the first direction (based on FIG. 7, the first pixel group PG1, the third pixel group PG3, the fifth pixel group PG5, the seventh pixel group PG7, or the like), and G-pixel groups including green-based pixels arranged in the first direction (based on FIG. 7, the second pixel group PG2, the fourth pixel group PG4, the sixth pixel group PG6, the eighth pixel group PG8, or the like). That is, the RB-pixel groups may refer to pixel groups including red-based pixels and blue-based pixels, and the G-pixel groups may refer to pixel groups including green-based pixels. The RB-pixel groups may be driven by the first data signal DATA1 of FIG. 6, and the G-pixel groups may be driven by the second data signal DATA2 of FIG. 6. The plurality of data lines DL may transfer data signals to the plurality of pixels PX, and detailed contents are the same as above.

The data distributor 170 may alternately transfer data signals to a pair of data lines among the plurality of data lines DL, and detailed contents are the same as above.

Referring to FIGS. 10 to 12, 14, and 15, horizontal lines HD1, HD3, HD5, HD7, or the like of data lines transferring first data signals (refer to DATA1 of FIG. 6) to the RB-pixel groups may all be connected to the blue-based pixels, or one end of each of the horizontal lines contacts CT1, CT3, CT5, CT7, or the like) may all be arranged in the area of the blue-based pixels.

Referring to FIGS. 10 to 12, 14, and 15, the display apparatus 10 of various embodiments may commonly include a pair of horizontal lines in which contacts are arranged in the area of blue-based pixels.

At this time, a pair of horizontal lines in which contacts are arranged in the area of blue-based pixels may be arranged adjacent to each other in a first direction or y-axis direction. Referring to FIGS. 10 to 12, 14, and 15, horizontal lines HD2, HD3, HD6, HD8, or the like of data lines transferring the second data signals (refer to DATA2 of FIG. 6) to the G-pixel groups may all be connected to the green-based pixels, or one end of each of the horizontal lines (contacts CT2, CT4, CT6, CT8, or the like) may all be arranged in the area of the green-based pixels.

Referring to FIGS. 10 to 12, 14 and 15, the display apparatus 10 of various embodiments may commonly include a pair of horizontal lines in which contacts are arranged in the area of green-based pixels.

At this time, a pair of horizontal lines in which contacts are arranged in the area of green-based pixels may be arranged adjacent to each other in the first direction or y-axis direction. In other words, referring to FIGS. 10 to 12, 14, and 15, in the plan view, target pixels around which contacts of the display apparatus 10 of various embodiments may commonly include a combination of continuous B-B/continuous G-G pixels.

However, herein, a target pixel may refer to a pixel arranged in the area of one end of a horizontal line or a contact. That is, the plurality of data lines DL may include RB-data lines extending in the second direction.

The RB-data lines DL1, DL3, DL5, DL7, or the like may transfer the first data signal DATA1 to the RB-pixel groups, and each of which may include a first horizontal line group extending from the first area AR1 to the second area AR2. The first horizontal line group includes a plurality of horizontal lines, and one end thereof may refer to horizontal lines arranged in the area of blue-based pixels. The plurality of data lines DL may include G-data lines DL2, DL4, DL6, DL8, or the like extending in the second direction.

The G-data lines may transfer the second data signal DATA2 to the G-pixel groups, and each of which may include a second horizontal line group extending from the first area AR1 to the second area AR2. The second horizontal line group includes a plurality of horizontal lines, and one end thereof may refer to horizontal lines arranged in the area of green-based pixels. Accordingly, one end of first horizontal line HD1 may be arranged in the area of the blue-based pixels of the RB-pixel groups in the second area AR2, and one end of each of horizontal lines of the second horizontal group may be arranged in the area of the green-based pixels in the second area AR2.

For example, the first horizontal line group may include at least a first-1 horizontal line and a first-2 horizontal line, which extend in the second direction, and the second horizontal line group may include at least a second-1 horizontal line and a second-2 horizontal line, which extend in the second direction.

For example, in plan view, the first-1 horizontal line and the first-2 horizontal line may be arranged adjacent to each other in the first direction.

In plan view, the second-1 horizontal line and the second-2 horizontal line may be arranged adjacent to each other in the first direction. For example, in the plan view, the first-1 horizontal line and the first-2 horizontal line, and the second-1 horizontal line and the second-2 horizontal line may be arranged adjacent to each other in the first direction.

Referring to FIG. 10, the first-1 horizontal line is the first horizontal line HD1, and the first-2 horizontal line is the third horizontal line HD3, which may be arranged adjacent to each other in the first direction (a continuous B-B structure).

Also, the second-1 horizontal line is the fourth horizontal line HD4, and the second-2 horizontal line is the sixth horizontal line HD6, which may be arranged adjacent to each other in the first direction (a continuous G-G structure). Also, in some cases, a continuous B-B structure and/or a continuous G-G structure may be further included in plan view. Referring to FIG. 11, the first-1 horizontal line is the third horizontal line HD3, and the first-2 horizontal line is the first horizontal line HD1, which may be arranged adjacent to each other in the first direction (a continuous B-B structure).

1 Also, the second-1 horizontal line is the fourth horizontal line HD4, and the second-2 horizontal line is the second horizontal line HD2, which are arranged adjacent to each other in the first direction (a continuous G-G structure). Also, in some cases, a continuous B-B structure and/or a continuous G-G structure may be further included in plan view. Referring to FIG. 12, the first-1 horizontal line is the fifth horizontal line HD5, and the first-2 horizontal line is the third horizontal line HD3, which may be arranged adjacent to each other in the first direction (a continuous B-B structure).

Also, the second-1 horizontal line is the fourth horizontal line HD4, and the second-2 horizontal line is the second horizontal line HD2, which are arranged adjacent to each other in the first direction (a continuous G-G structure). Also, in some cases, a continuous B-B structure and/or a continuous G-G structure may be further included in plan view. Referring to FIG. 14, the first-1 horizontal line is the first horizontal line HD1, and the first-2 horizontal line is the third horizontal line HD3, which may be arranged adjacent to each other in the first direction (a continuous B-B structure).

Also, the second-1 horizontal line is the second horizontal line HD2, and the second-2 horizontal line is the fourth horizontal line HD4, which are arranged adjacent to each other in the first direction (a continuous G-G structure). Also, in some cases, a continuous B-B structure and/or a continuous G-G structure may be further included in plan view. Referring to FIG. 15, the first-horizontal line is the third horizontal line HD3, and the first-2 horizontal line is the fifth horizontal line HD5, which are arranged adjacent to each other in the first direction (a continuous B-B structure).

Also, the second-1 horizontal line is the second horizontal line HD2, and the second-2 horizontal line is the fourth horizontal line HD4, which are arranged adjacent to each other in the first direction (a continuous G-G structure). Also, in some cases, a continuous B-B structure and/or a continuous G-G structure may be further included in plan view. According to one or more embodiments described above, a display apparatus for reducing reduction in image quality due to signal interference between adjacent lines may be implemented.

The scope of the disclosure is limited by these effects. It should be understood that embodiments described herein should be considered in a descriptive sense only and not for purposes of limitation.

Descriptions of aspects within each embodiment should typically be considered as available for other similar aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A display apparatus comprising:

a substrate;

pixels above the substrate, and comprising:

a first pixel group comprising alternating red-based pixels and blue-based pixels arranged in a first direction;

a second pixel group comprising green-based pixels arranged in the first direction; and a third pixel group comprising alternating red-based pixels and blue-based pixels arranged in the first direction;

data lines for transferring data signals to the pixels; and a data distributor for alternately transferring the data signals to a pair of the data lines, wherein in each of the first pixel group and the third pixel group, one of the red-based pixels is adjacent to one of the blue-based pixels on a first side, and is adjacent to another one of the blue-based pixels on a second side opposite to the first side, and wherein the data lines comprise:

a first data line comprising a first horizontal line extending in a second direction crossing the first direction for transferring a data signal to the first pixel group, one end of the first horizontal line being adjacent to one of the blue-based pixels of the first pixel group;

a second data line comprising a second horizontal line extending in the second direction for transferring the data signal to the second pixel group, one end of the second horizontal line being adjacent to one of the green-based pixels of the second pixel group; and a third data line comprising a third horizontal line extending in the second direction for transferring the data signal to the third pixel group, one end of the third horizontal line being adjacent to one of the blue-based pixels of the third pixel group.

2. The display apparatus of claim 1, wherein, in plan view, the second pixel group is between the first pixel group and the third pixel group.

3. The display apparatus of claim 2, wherein, in plan view, the first horizontal line is between the second horizontal line and the third horizontal line.

4. The display apparatus of claim 2, wherein, in plan view, one of the red-based pixels of the first pixel group and one of the blue-based pixels of the third pixel group are alternately arranged in the second direction in each row.

5. The display apparatus of claim 1, further comprising a group of connection nodes electrically connecting the data lines and the data distributor.

6. The display apparatus of claim 5, wherein the substrate comprises, in plan view, a first area at one side of a first virtual line extending in the first direction, and a second area at another side of the first virtual line.

7. The display apparatus of claim 6, wherein the group of the connection nodes is between the pixels and the data distributor in the first area.

8. The display apparatus of claim 1, wherein, in plan view, a length of the first horizontal line is longer than a length of the second horizontal line and a length of the third horizontal line.

9. The display apparatus of claim 1, further comprising gate lines for transferring scan signals to the pixels and extending in the second direction.

10. The display apparatus of claim 9, wherein the gate lines comprise a first gate line adjacent to the second horizontal line, a second gate line adjacent to the first horizontal line, and a third gate line adjacent to the third horizontal line.

11. The display apparatus of claim 10, wherein a brightness of the one of the blue-based pixels of the first pixel group is configured to be changed by one of the scan signals of the second gate line.

12. The display apparatus of claim 10, wherein the second gate line is arranged in a 4n-1-th order among the gate lines.

13. The display apparatus of claim 12, wherein the first gate line is arranged in a 4n-th order among the gate lines.

14. The display apparatus of claim 10, wherein the second gate line is arranged in an 8n-5-th order among the gate lines.

15. The display apparatus of claim 14, wherein the first gate line is arranged in an 8n-4-th order among the gate lines.

16. The display apparatus of claim 1, wherein the first data line further comprises a first vertical line extending in the first direction, adjacent to the first pixel group, and electrically connected to one end of the first horizontal line through a first contact that is adjacent to the one of the blue-based pixels of the first pixel group.

17. The display apparatus of claim 7, wherein the first data line further comprises a first sub line extending in the first direction in the first area of the substrate for connecting another end of the first horizontal line and the group of the connection nodes.

18. The display apparatus of claim 17, wherein the one end of the first horizontal line is in the second area of the substrate, wherein the other end of the first horizontal line is in the first area of the substrate, and wherein the first data line further comprises a first vertical line extending in the first direction in the second area of the substrate.

19. The display apparatus of claim 12, wherein the second gate line is arranged in a 4n-3-th order among the gate lines.

20. The display apparatus of claim 17, wherein the second data line further comprises a second sub line extending in the first direction in the first area of the substrate for connecting another end of the second horizontal line and the group of the connection nodes, and having a length that is longer than a length of the first sub line.

* * * * *